United States Patent
Khare et al.

(10) Patent No.: US 12,034,704 B2
(45) Date of Patent: Jul. 9, 2024

(54) OPTIMIZATION OF NETWORK FUNCTION PROFILE ADMINISTRATION AND REGISTRATION

(71) Applicant: Nokia Technologies Oy, Espoo (FI)

(72) Inventors: Saurabh Khare, Bangalore (IN); Bruno Landais, Pleumeur-Bodou (FR); Thomas Belling, Erding (DE); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 390 days.

(21) Appl. No.: 17/394,828

(22) Filed: Aug. 5, 2021

(65) Prior Publication Data

US 2022/0045991 A1    Feb. 10, 2022

(30) Foreign Application Priority Data

Aug. 6, 2020    (IN) .............................. 202041033770

(51) Int. Cl.
*H04L 41/084* (2022.01)
*H04L 9/40* (2022.01)
(Continued)

(52) U.S. Cl.
CPC ...... *H04L 63/0281* (2013.01); *H04L 41/0843* (2013.01); *H04L 63/102* (2013.01); *H04L 67/141* (2013.01); *H04L 67/30* (2013.01)

(58) Field of Classification Search
None
See application file for complete search history.

(56) References Cited

U.S. PATENT DOCUMENTS 10,833,938 B1 * 11/2020 Rajput ................ H04L 67/1095
2008/0313332 A1 * 12/2008 Wang .................. H04L 12/4633
709/226
(Continued)

FOREIGN PATENT DOCUMENTS

KR     20220006908 A  *  7/2020
RU        2786949 C1 * 12/2022    ......... H04L 41/0853

OTHER PUBLICATIONS

Extended European Search Report received for corresponding European Patent Application No. 21189301.1, dated Dec. 16, 2021, 14 pages.

(Continued)

*Primary Examiner* — Chris Parry
*Assistant Examiner* — Abderrahmen Chouat
(74) *Attorney, Agent, or Firm* — Barta Jones, PLLC

(57) ABSTRACT

There are provided measures for optimization of network function profile administration and registration. Such measures exemplarily comprise, at a network repository function entity, receiving, from a control entity, network entity profile template information, storing said network entity profile template information, wherein said network entity profile template information comprises a network entity profile template including an identifier of said network entity profile template and a profile content of said network entity profile template, said profile content including at least one profile attribute, receiving, from a network entity, a network entity registration request comprising said identifier of said network entity profile template, and generating a network entity profile for said network entity based on said at least one profile attribute.

9 Claims, 28 Drawing Sheets

(51) Int. Cl.
*H04L 67/141* (2022.01)
*H04L 67/30* (2022.01)

(56) References Cited

U.S. PATENT DOCUMENTS

| | | | | |
|---|---|---|---|---|
| 2017/0289060 | A1* | 10/2017 | Aftab | H04L 67/1097 |
| 2018/0132138 | A1* | 5/2018 | Senarath | H04L 41/0813 |
| 2019/0223055 | A1* | 7/2019 | Bor Yaliniz | H04L 41/0896 |
| 2019/0230556 | A1* | 7/2019 | Lee | H04W 28/16 |
| 2019/0238425 | A1* | 8/2019 | Mladin | H04L 41/342 |
| 2020/0236594 | A1* | 7/2020 | Tang | H04W 28/24 |
| 2021/0289403 | A1* | 9/2021 | Suh | H04W 36/0027 |
| 2021/0314223 | A1* | 10/2021 | Thulasi | H04L 41/5041 |
| 2021/0314224 | A1* | 10/2021 | Sauer | H04L 41/0843 |
| 2021/0352534 | A1* | 11/2021 | Tiwari | H04L 41/5009 |
| 2022/0038999 | A1* | 2/2022 | Sapra | H04W 60/00 |
| 2023/0006888 | A1* | 1/2023 | Turina | H04L 41/122 |

OTHER PUBLICATIONS

"Recovery Time for NF Service Set and NF Set", 3GPP TSG-CT WG4 Meeting #97e, C4-202375, Ericsson, Apr. 15-24, 2020, 19 pages.

"Discussion on NRF APIs extensions to support NF (Service) Set Profiles", 3GPP TSG-CT WG4 Meeting #101e, C4-205146, Agenda: 6.1.2, Nokia, Nov. 3-13, 2020, 15 pages.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"3rd Generation Partnership Project; Technical Specification Group Core Network and Terminals; 5G System; Network Function Repository Services; Stage 3 (Release 16)", 3GPP TS 29.510, V16.3.0, Mar. 2020, pp. 1-172.

"Enablers for multiple SCPs (23.501)", 3GPP TSG-SA2 Meeting #138-E, S2-2003269, Oracle Corporation, Apr. 20-23, 2020, 11 pages.

"Enablers for multiple SCPs (23.502)", 3GPP TSG-SA2 Meeting #138-E, S2-2003270, Oracle Corporation, Apr. 20-23, 2020, 7 pages.

Bryan et al., "JavaScript Object Notation (JSON) Patch", RFC 6902, Internet Engineering Task Force, Apr. 2013, pp. 1-18.

Hoffman et al., "JSON Merge Patch", RFC 7396, Internet Engineering Task Force, Oct. 2014, pp. 1-9.

Notice of Allowance received for corresponding European Patent Application No. 21189301.1, dated Feb. 21, 2024, 8 pages.

\* cited by examiner

S121 — transmitting, towards a network repository function entity, network entity profile template information (said network entity profile template information comprises a network entity profile template including an identifier of said network entity profile template and a profile content of said network entity profile template, said profile content including at least one profile attribute)

Fig. 12

OPTIMIZATION OF NETWORK FUNCTION PROFILE ADMINISTRATION AND REGISTRATION

FIELD

Various example embodiments relate to optimization of network function profile administration and registration. More specifically, various example embodiments exemplarily relate to measures (including methods, apparatuses and computer program products) for realizing optimization of network function profile administration and registration.

BACKGROUND

The present specification generally relates to central network entities (e.g. network repository functions (NRF)) providing repositories of e.g. functions and services of network functions (NF), network function entities (e.g. network functions (NF)) providing and announcing their e.g. functions and services and/or discovering and utilizing functions and services of other NFs, and control and/or management entities (e.g. operation, administration and maintenance (OAM)) controlling and/or managing e.g. central network entities and/or network function entities.

NRFs are central entities in the Third Generation Partnership Project (3GPP) 5G core network (5GC) for the discovery of NFs and service communication proxies (SCP).

NF or SCP register profiles at the NRF containing for example an NF identifier, an NF type, interfaces of the NF or SCP described as an internet protocol (IP) address or a fully-qualified host name (FQDN), services offered by the NF, and slices information.

The NRF provides a discovery service providing information about the NsF and/or SCPs registered at the NRF. The NF discovery service provides NF or SCP profiles containing the registered information, and other NFs or SCPs can use the NRF discovery service for the discovery of NFs and SCPs registered at the NRF and the selection of NFs and SCPs to communicate with.

The NF profile size is growing, which is a known issue in 3GPP.

NF or SCP profiles, registered at the NRF, have a large NF profile size. For instance, an NF (unified data management (UDM)) registers itself at an NRF with an NF profile size of more than 2 MB (this is an exemplary but practical issue encountered in some network deployment). The size of NF profiles will continue to grow in future 3GPP releases to support new 3GPP functionalities. Currently, there is no way available in 3GPP to reduce the amount of parameters that need to be provided for NF profile registration.

While NFs or SCPs themselves register to the NRF, these are administered via OAM. Thus, large profiles with many common parameters, in particular for NFs of a given type, also mean many replicated efforts for OAM and a high signaling load.

FIG. 18 shows a schematic diagram of signaling sequences for configuring and registering profiles of network functions.

According to FIG. 18, an OAM configures each of NFs NF1 to NF3 with its respective (complete) profile, while each of NFs NF1 to NF3 registers itself with its respective (complete) profile.

Besides the high signaling load of such approach, another major disadvantage is the potential misconfigurations at NFs due to the large size of the NF profiles. This is a crucial disadvantage, as sometime misconfiguration may lead to a network outage.

Hence, the problem arises that the NF profile registration and the related administration of NF profiles via OAM is to be optimized in order to reduce network load and to make network function profile administration and registration more robust against misconfigurations.

Hence, there is a need to provide for optimization of network function profile administration and registration.

SUMMARY

Various example embodiments aim at addressing at least part of the above issues and/or problems and drawbacks.

Various aspects of example embodiments are set out in the appended claims.

According to an example aspect, there is provided a method of a control entity, the method comprising transmitting, towards a network repository function entity, network entity profile template information, wherein said network entity profile template information comprises a network entity profile template including an identifier of said network entity profile template and a profile content of said network entity profile template, said profile content including at least one profile attribute.

According to an example aspect, there is provided a method of a network repository function entity, the method comprising receiving, from a control entity, network entity profile template information, and storing said network entity profile template information, wherein said network entity profile template information comprises a network entity profile template including an identifier of said network entity profile template and a profile content of said network entity profile template, said profile content including at least one profile attribute, and the method further comprises receiving, from a network entity, a network entity registration request comprising said identifier of said network entity profile template, and generating a network entity profile for said network entity based on said at least one profile attribute.

According to an example aspect, there is provided a method of a network entity, the method comprising transmitting, towards a network repository function entity, a network entity registration request comprising an identifier of a network entity profile template, and optionally receiving, from a control entity, a network entity profile configuration, wherein said network entity profile configuration comprises said identifier of said network entity profile template and information on network entity specific changes to said network entity profile template.

According to an example aspect, there is provided a method of a control entity, the method comprising transmitting, towards a network repository function entity, network entity profile information for at least one network entity.

According to an example aspect, there is provided a method of a network repository function entity, the method comprising receiving, from a control entity, network entity profile information for at least one network entity, and storing said respective network entity profile information.

According to an example aspect, there is provided a method of a network entity, the method comprising transmitting, towards a network repository function entity, a network entity registration request comprising an identifier of said network entity; and receiving, from a control entity, a network entity registration configuration, wherein said network entity registration configuration comprises said identifier of said network entity and address information of said network repository function entity.

According to an example aspect, there is provided an apparatus of a control entity, the apparatus comprising transmitting circuitry configured to transmit, towards a network repository function entity, network entity profile template information, wherein said network entity profile template information comprises a network entity profile template including an identifier of said network entity profile template and a profile content of said network entity profile template, said profile content including at least one profile attribute.

According to an example aspect, there is provided an apparatus of a network repository function entity, the apparatus comprising receiving circuitry configured to receive, from a control entity, network entity profile template information, and storing circuitry configured to store said network entity profile template information, wherein said network entity profile template information comprises a network entity profile template including an identifier of said network entity profile template and a profile content of said network entity profile template, said profile content including at least one profile attribute, and the receiving circuitry is further configured to receive, from a network entity, a network entity registration request comprising said identifier of said network entity profile template, and the apparatus further comprises generating circuitry configured to generate a network entity profile for said network entity based on said at least one profile attribute.

According to an example aspect, there is provided an apparatus of a network entity, the apparatus comprising transmitting circuitry configured to transmit, towards a network repository function entity, a network entity registration request comprising an identifier of a network entity profile template.

According to an example aspect, there is provided an apparatus of a control entity, the apparatus comprising transmitting circuitry configured to transmit, towards a network repository function entity, network entity profile information for at least one network entity.

According to an example aspect, there is provided an apparatus of a network repository function entity, the apparatus comprising receiving circuitry configured to receive, from a control entity, network entity profile information for at least one network entity, and storing circuitry configured to store said respective network entity profile information.

According to an example aspect, there is provided an apparatus of a network entity, the apparatus comprising transmitting circuitry configured to transmit, towards a network repository function entity, a network entity registration request comprising an identifier of said network entity.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

According to an example aspect, there is provided an apparatus of a control entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function entity, network entity profile template information, wherein said network entity profile template information comprises a network entity profile template including an identifier of said network entity profile template and a profile content of said network entity profile template, said profile content including at least one profile attribute.

According to an example aspect, there is provided an apparatus of a network repository function entity, the apparatus comprising at least one processor, at least one memory including computer program code, and at least one interface configured for communication with at least another apparatus, the at least one processor, with the at least one memory and the computer program code, being configured to cause the apparatus to perform receiving, from a control entity, network entity profile template information, and storing said network entity profile template information, wherein said network entity profile template information comprises a network entity profile template including an identifier of said network entity profile template and a profile content of said network entity profile template, said profile content including at least one profile attribute, and the at least one processor, with the at least one memory and the computer program code, being configured to cause the apparatus to perform receiving, from a network entity, a network entity registration request comprising said identifier of said network entity profile template, and generating a network entity profile for said network entity based on said at least one profile attribute.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function entity, a network entity registration request comprising an identifier of a network entity profile template.

According to an example aspect, there is provided an apparatus of a control entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function entity, network entity profile information for at least one network entity.

According to an example aspect, there is provided an apparatus of a network repository function entity, the apparatus comprising at least one processor, at least one memory including computer program code, and at least one interface configured for communication with at least another apparatus, the at least one processor, with the at least one memory and the computer program code, being configured to cause the apparatus to perform receiving, from a control entity, network entity profile information for at least one network entity, and storing said respective network entity profile information.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network repository function entity, a network entity registration request comprising an identifier of said network entity.

Any one of the above aspects enables an efficient provision/storage and exchange of network function profile information to thereby solve at least part of the problems and drawbacks identified in relation to the prior art.

By way of example embodiments, there is provided optimization of network function profile administration and registration. More specifically, by way of example embodiments, there are provided measures and mechanisms for realizing optimization of network function profile administration and registration.

Thus, improvement is achieved by methods, apparatuses and computer program products enabling/realizing optimization of network function profile administration and registration.

BRIEF DESCRIPTION OF THE DRAWINGS

In the following, the present disclosure will be described in greater detail by way of non-limiting examples with reference to the accompanying drawings, in which FIG. 12 is a schematic diagram of a procedure according to example embodiments.

DETAILED DESCRIPTION

Figure 1:
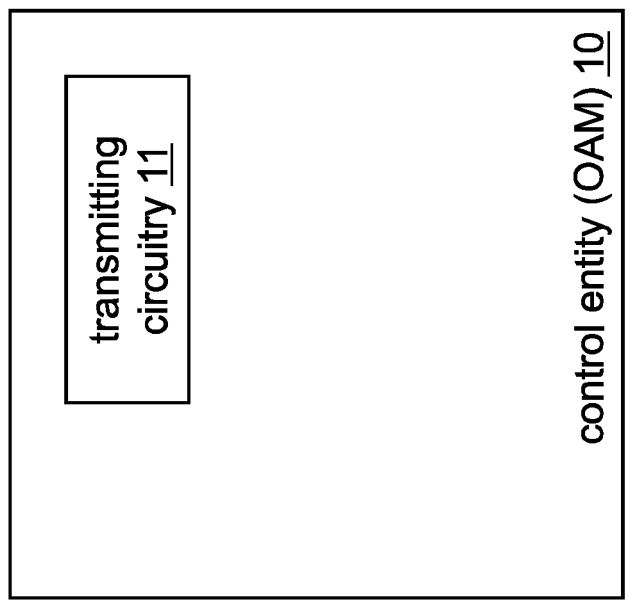
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

In particular, the present disclosure and its embodiments may be applicable in any network compound in which profile information is registered and announced/provided e.g. for the selection of network entities or network function entities suitable for an intended purpose.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) optimization of network function profile administration and registration.

Many NF or SCP profiles have many common parameters, in particular for NFs of a given type. Thus, in general, according to example embodiments, the profile registration and handling is optimized considering those commonalities.

In particular, according to example embodiments of a first approach, in brief, an NRF is configured with profile templates (respectively identified by a profile template ID), e.g. via an OAM. An NF or SCP is configured with a profile template ID and provides this during registration at the NRF. The NF or SCP is not required to configure all parameters of the (its) individual NF profile. When receiving such a registration request, the NRF constructs the NF or SCP profile of the registering NF or SCP by combining the stored profile template (identified by the profile template ID stated by the NF of SCP) with the parameters provided by the NF or SCP in such a manner that these parameters overwrite parameters in the profile template (i.e. a value of a parameter of the referenced profile template is overwritten (in the constructed profile) with a value of the same parameter explicitly provided by the NF or SCP). The NRF may provide the NF profile in a reply to the registration and may thus make the NF or SCP aware of extra parameters in the profile that may be necessary for the operation of the NF or SCP. To make the NF or SCP aware of that the NRF supports registration with a profile template ID, the known hypertext transfer protocol (HTTP) OPTIONS method may be enhanced to indicate this (a related) NRF capability in the reply.

According to further example embodiments of a second approach, in brief, an NRF is configured with complete NF or SCP profiles ((respectively identified by an ID of the NF or SCP)), e.g. via an OAM. Alternatively, the NRF may be configured with profile template(s), for each profile template with information for which NFs or SCPs the template is applicable, and with additional information for each NF or SCP profile describing the differences to the profile template. An NF or SCP can register at the NRF with its ID (NF/SCP ID) without providing all the attributes available in the respective NF/SCP profile. The NRF selects the NF or SCP profile and/or profile template based on the received NF or SCP ID and constructs the NF or SCP profile of the registering NF or SCP by combining the stored profile template with configured parameters applicable for the individual NF or SCP and possible parameters provided by the NF or SCP in such a manner these parameters overwrite parameters in the profile template and/or configured parameters (i.e. a value of a parameter of the profile template is overwritten (in the constructed profile) with a value of the same parameter in the additional information describing the differences to the profile template, and a value of a parameter of the thus constructed (interim) profile (or of a parameter of the profile template) is overwritten (in the constructed profile) with a value of the same parameter explicitly provided by the NF or SCP). The NRF may provide the NF or SCP profile in a reply to the registration and may thus make the NF or SCP aware of extra parameters in the profile that may be necessary for the operation of the NF or SCP. To make the NF or SCP aware of that the NRF supports registration via IDs, the known HTTP OPTIONS method may be enhanced to indicate this (a related) NRF capability in the reply.

In the following, example embodiments are explained in more detail.

FIG. 1 is a block diagram illustrating an apparatus according to example embodiments. The apparatus may be a control entity 10 such as an operation, administration and maintenance entity (OAM) comprising a transmitting circuitry 11. The transmitting circuitry 11 transmits, towards a network repository function entity, network entity profile template information. Here, said network entity profile template information comprises a network entity profile template including an identifier of said network entity profile template and a profile content of said network entity profile template, and said profile content includes at least one profile attribute. FIG. 12 is a schematic diagram of a procedure according to example embodiments. The apparatus according to FIG. 1 may perform the method of FIG. 12 but is not limited to this method. The method of FIG. 12 may be performed by the apparatus of FIG. 1 but is not limited to being performed by this apparatus.

As shown in FIG. 12, a procedure according to example embodiments comprises an operation of transmitting (S121), towards a network repository function entity, network entity profile template information, wherein said network entity profile template information comprises a network entity profile template including an identifier of said network entity profile template and a profile content of said network entity profile template, said profile content including at least one profile attribute.

In an embodiment at least some of the functionalities of the apparatus shown in FIG. 1 may be shared between two physically separate devices forming one operational entity. Therefore, the apparatus may be seen to depict the operational entity comprising one or more physically separate devices for executing at least some of the described processes.

According to a variation of the procedure shown in FIG. 12, exemplary additional operations are given, which are inherently independent from each other as such. According to such variation, an exemplary method according to example embodiments may comprise an operation of transmitting, towards a network entity, a network entity profile configuration, wherein said network entity profile configuration comprises said identifier of said network entity profile template.

According to further example embodiments, said network entity profile configuration comprises information on network entity specific changes to said network entity profile template.

According to further example embodiments, said network entity profile template information is transmitted utilizing a hypertext transfer protocol PUT method.

According to further example embodiments, said control entity is an operations, administration and maintenance entity.

Figure 2:
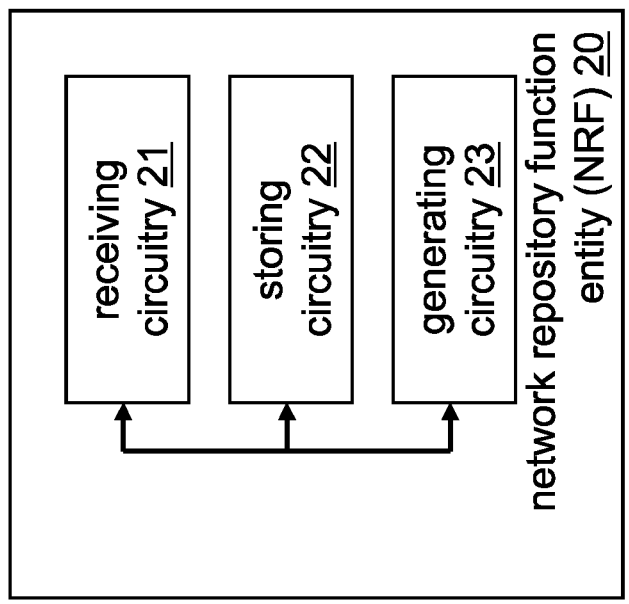
FIG. 2 is a block diagram illustrating an apparatus according to example embodiments.
Figure 13:
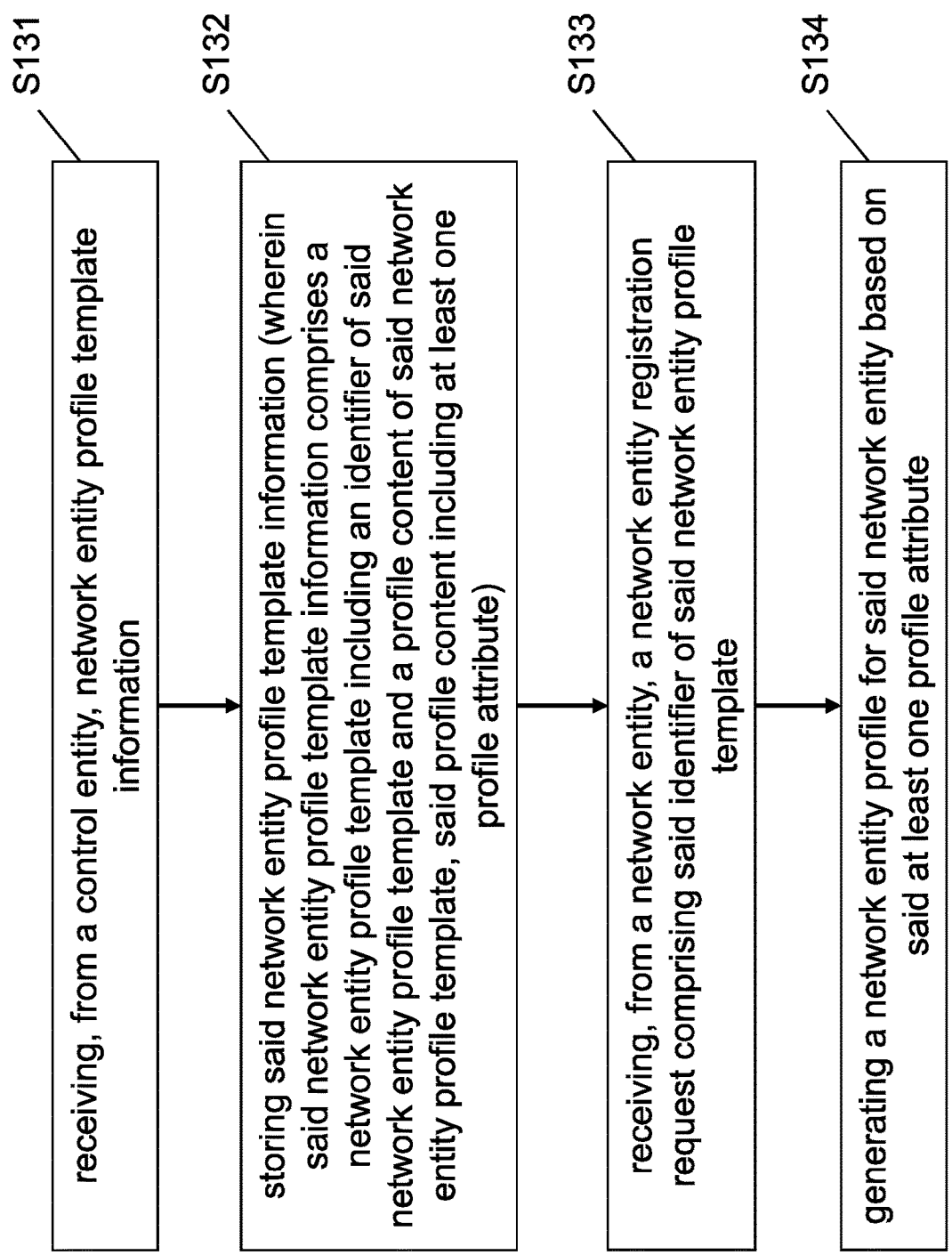
FIG. 13 is a schematic diagram of a procedure according to example embodiments.

FIG. 2 is a block diagram illustrating an apparatus according to example embodiments. The apparatus may be a network function repository entity 20 such as an NRF comprising a receiving circuitry 21, a storing circuitry 22, and a generating circuitry 23. The receiving circuitry 21 receives, from a control entity, network entity profile template information. The storing circuitry 22 stores said network entity profile template information. Here, said network entity profile template information comprises a network entity profile template including an identifier of said network entity profile template and a profile content of said network entity profile template, and said profile content includes at least one profile attribute. Further, the receiving circuitry 21 receives, from a network entity, a network entity registration request comprising said identifier of said network entity profile template. The generating circuitry 23 generates a network entity profile for said network entity based on said at least one profile attribute. FIG. 13 is a schematic diagram of a procedure according to example embodiments. The apparatus according to FIG. 2 may perform the method of FIG. 13 but is not limited to this method. The method of FIG. 13 may be performed by the apparatus of FIG. 2 but is not limited to being performed by this apparatus.

As shown in FIG. 13, a procedure according to example embodiments comprises an operation of receiving (S131), from a control entity, network entity profile template information, and an operation of storing (S132) said network entity profile template information, wherein said network entity profile template information comprises a network entity profile template including an identifier of said network entity profile template and a profile content of said network entity profile template, said profile content including at least one profile attribute. Further, the procedure according to example embodiments comprises an operation of receiving (S133), from a network entity, a network entity registration request comprising said identifier of said network entity profile template, and an operation of generating (S134) a network entity profile for said network entity based on said at least one profile attribute.

Figure 3:
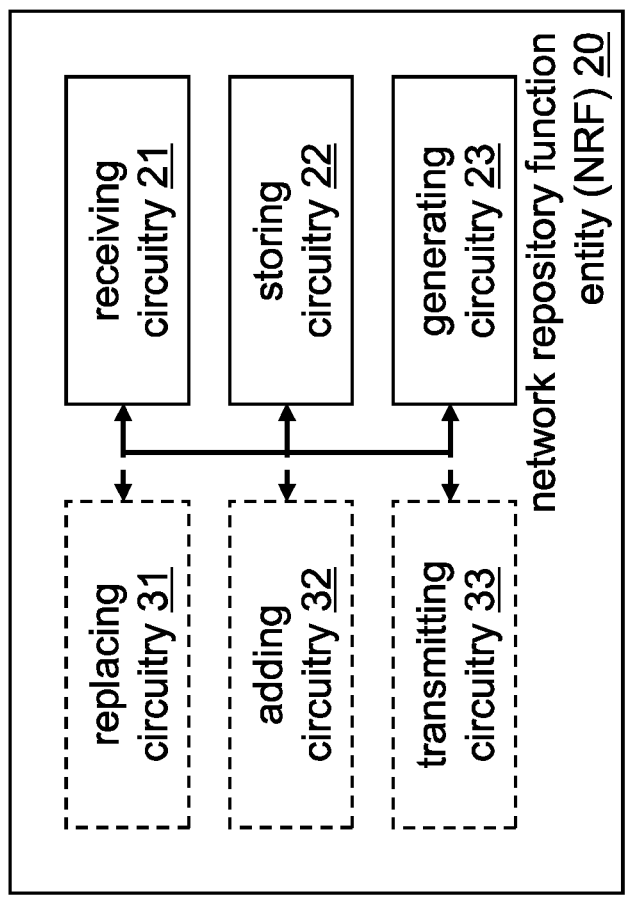
FIG. 3 is a block diagram illustrating an apparatus according to example embodiments.

FIG. 3 is a block diagram illustrating an apparatus according to example embodiments. In particular, FIG. 3 illustrates a variation of the apparatus shown in FIG. 2. The apparatus according to FIG. 3 may thus further comprise a replacing circuitry 31, an adding circuitry 32, and/or a transmitting circuitry 33.

In an embodiment at least some of the functionalities of the apparatus shown in FIG. 2 (or 3) may be shared between two physically separate devices forming one operational entity. Therefore, the apparatus may be seen to depict the operational entity comprising one or more physically separate devices for executing at least some of the described processes.

According to a variation of the procedure shown in FIG. 13, exemplary details of the generating operation (S134) are given, which are inherently independent from each other as such.

According to such variation, said network entity registration request includes a network entity specific attribute, and such exemplary generating operation (S134) according to example embodiments may comprise an operation of replacing, in said network entity profile, if said at least one profile attribute includes said network entity specific attribute, a value of said network entity specific attribute included in said at least one profile attribute by a value of said network entity specific attribute included in said network entity registration request, and an operation of adding, to said network entity profile, if said at least one profile attribute does not include said network entity specific attribute, said network entity specific attribute included in said network entity registration request.

According to a variation of the procedure shown in FIG. 13, exemplary additional operations and exemplary details of the generating operation (S134) are given, which are inherently independent from each other as such. According to such variation, an exemplary method according to example embodiments may comprise an operation of receiving, from said network entity, a network entity registration update including a network entity specific attribute. Further, such exemplary generating operation (S134) according to example embodiments may comprise an operation of replacing, in said network entity profile, if said at least one profile attribute includes said network entity specific attribute, a value of said network entity specific attribute included in said at least one profile attribute by a value of said network entity specific attribute included in said network entity registration update, and an operation of adding, to said network entity profile, if said at least one profile attribute does not include said network entity specific attribute, said network entity specific attribute included in said network entity registration update.

According to further example embodiments, said network entity specific attribute is provided in said network entity registration request or said network entity registration update utilizing JavaScript object notation PATCH or JavaScript object notation MERGE PATCH.

According to further example embodiments, said network entity registration request and/or said network entity registration update is received utilizing a hypertext transfer protocol PUT or PATCH method.

According to further example embodiments, said network entity profile template information is received utilizing a hypertext transfer protocol PUT method.

According to a variation of the procedure shown in FIG. 13, exemplary additional operations are given, which are inherently independent from each other as such. According to such variation, an exemplary method according to example embodiments may comprise an operation of transmitting, towards said network entity, attributes error information indicating that said network entity specific attribute is not applicable with said network entity profile template.

According to further example embodiments, said network entity registration request is received utilizing a hypertext transfer protocol PUT method.

According to a variation of the procedure shown in FIG. 13, exemplary additional operations are given, which are inherently independent from each other as such. According to such variation, an exemplary method according to example embodiments may comprise an operation of transmitting, towards said network entity, network entity profile template identifier error information indicating that said identifier included in said network entity registration request is unknown.

According to a variation of the procedure shown in FIG. 13, exemplary additional operations are given, which are inherently independent from each other as such. According to such variation, an exemplary method according to example embodiments may comprise an operation of transmitting, towards said network entity, said network entity profile generated for said network entity.

According to a variation of the procedure shown in FIG. 13, exemplary additional operations are given, which are inherently independent from each other as such. According to such variation, an exemplary method according to example embodiments may comprise an operation of receiving, from said network entity, an inquiry with respect to features supported by said network repository function entity, and an operation of transmitting, towards said network entity, information indicative of that network entity profile templates are supported by said network repository function entity.

According to further example embodiments, said network entity profile template information is received utilizing a hypertext transfer protocol PUT method.

Figure 4:
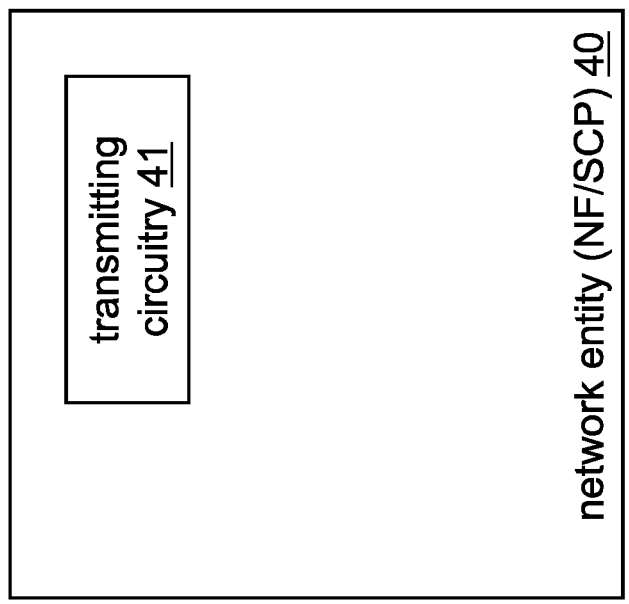
FIG. 4 is a block diagram illustrating an apparatus according to example embodiments.
Figure 14:
FIG. 14 is a schematic diagram of a procedure according to example embodiments.

FIG. 4 is a block diagram illustrating an apparatus according to example embodiments. The apparatus may be a network entity 40 such as a network function (entity) (NF) or service communication proxy (entity) (SCP) comprising a transmitting circuitry 41. The transmitting circuitry 41 transmits, towards a network repository function entity, a network entity registration request comprising an identifier of a network entity profile template. FIG. 14 is a schematic diagram of a procedure according to example embodiments. The apparatus according to FIG. 4 may perform the method of FIG. 14 but is not limited to this method. The method of FIG. 14 may be performed by the apparatus of FIG. 4 but is not limited to being performed by this apparatus.

As shown in FIG. 14, a procedure according to example embodiments comprises an operation of transmitting (S141), towards a network repository function entity, a network entity registration request comprising an identifier of a network entity profile template.

Figure 5:
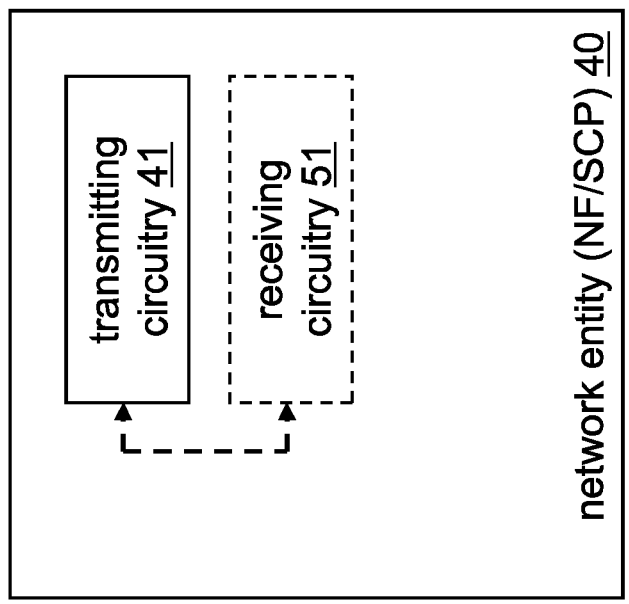
FIG. 5 is a block diagram illustrating an apparatus according to example embodiments.

FIG. 5 is a block diagram illustrating an apparatus according to example embodiments. In particular, FIG. 5 illustrates a variation of the apparatus shown in FIG. 4. The apparatus according to FIG. 5 may thus further comprise a receiving circuitry 51.

In an embodiment at least some of the functionalities of the apparatus shown in FIG. 4 (or 5) may be shared between two physically separate devices forming one operational entity. Therefore, the apparatus may be seen to depict the operational entity comprising one or more physically separate devices for executing at least some of the described processes.

According to a variation of the procedure shown in FIG. 14, exemplary additional operations are given, which are inherently independent from each other as such. According to such variation, an exemplary method according to example embodiments may comprise an operation of receiving, from a control entity, a network entity profile configuration, wherein said network entity profile configuration comprises said identifier of said network entity profile template and information on network entity specific changes to said network entity profile template.

According to further example embodiments, said network entity registration request includes a network entity specific attribute.

According to further example embodiments, said network entity specific attribute is based on said network entity specific changes to said network entity profile template.

According to a variation of the procedure shown in FIG. 14, exemplary additional operations are given, which are inherently independent from each other as such. According to such variation, an exemplary method according to example embodiments may comprise an operation of transmitting, towards said network repository function entity, a network entity registration update including a network entity specific attribute.

According to further example embodiments, said network entity specific attribute is provided in said network entity registration request or said network entity registration update utilizing JavaScript object notation PATCH or JavaScript object notation MERGE PATCH.

According to further example embodiments, said network entity registration update is transmitted utilizing a hypertext transfer protocol PUT or PATCH method.

According to a variation of the procedure shown in FIG. 14, exemplary additional operations are given, which are inherently independent from each other as such. According to such variation, an exemplary method according to example embodiments may comprise an operation of receiving, from said network repository function entity, attributes error information indicating that said network entity specific attribute is not applicable with said network entity profile template.

According to further example embodiments, said network entity registration request is transmitted utilizing a hypertext transfer protocol PUT method.

According to a variation of the procedure shown in FIG. 14, exemplary additional operations are given, which are inherently independent from each other as such. According to such variation, an exemplary method according to example embodiments may comprise an operation of receiving, from said network repository function entity, network entity profile template identifier error information indicating that said identifier included in said network entity registration request is unknown.

According to a variation of the procedure shown in FIG. 14, exemplary additional operations are given, which are inherently independent from each other as such. According to such variation, an exemplary method according to example embodiments may comprise an operation of receiving, from said network repository function entity, a network entity profile generated for said network entity.

According to a variation of the procedure shown in FIG. 14, exemplary additional operations are given, which are inherently independent from each other as such. According to such variation, an exemplary method according to example embodiments may comprise an operation of transmitting, towards said network repository function entity, an inquiry with respect to features supported by said network repository function entity, and an operation of receiving, from said network repository function entity, information indicative of that network entity profile templates are supported by said network repository function entity.

According to further example embodiments, said network entity is a network function entity or a service communication proxy entity.

Figure 6:
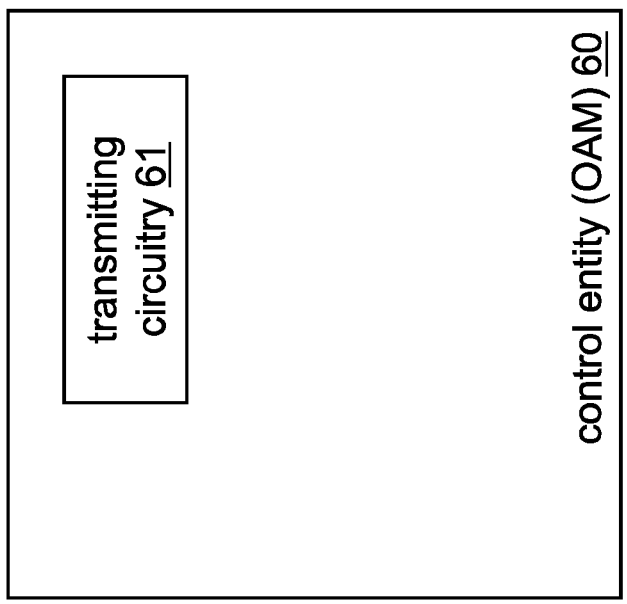
FIG. 6 is a block diagram illustrating an apparatus according to example embodiments.
Figure 15:
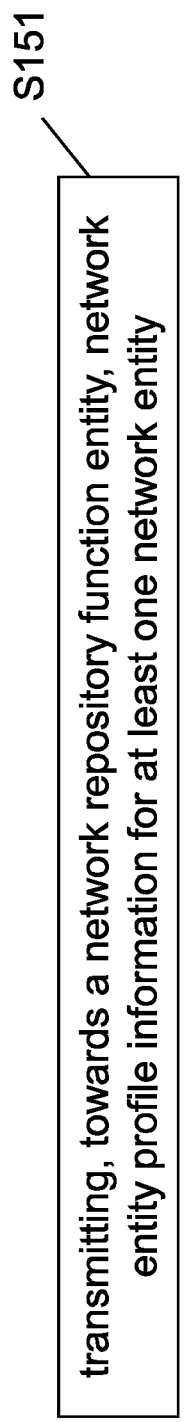
FIG. 15 is a schematic diagram of a procedure according to example embodiments.

FIG. 6 is a block diagram illustrating an apparatus according to example embodiments. The apparatus may be a control entity 60 such as an operation, administration and maintenance entity (OAM) comprising a transmitting circuitry 61. The transmitting circuitry 61 transmits, towards a network repository function entity, network entity profile information for at least one network entity. FIG. 15 is a schematic diagram of a procedure according to example embodiments. The apparatus according to FIG. 6 may perform the method of FIG. 15 but is not limited to this method. The method of FIG. 15 may be performed by the apparatus of FIG. 6 but is not limited to being performed by this apparatus.

As shown in FIG. 15, a procedure according to example embodiments comprises an operation of transmitting (S151), towards a network repository function entity, network entity profile information for at least one network entity.

Figure 7:
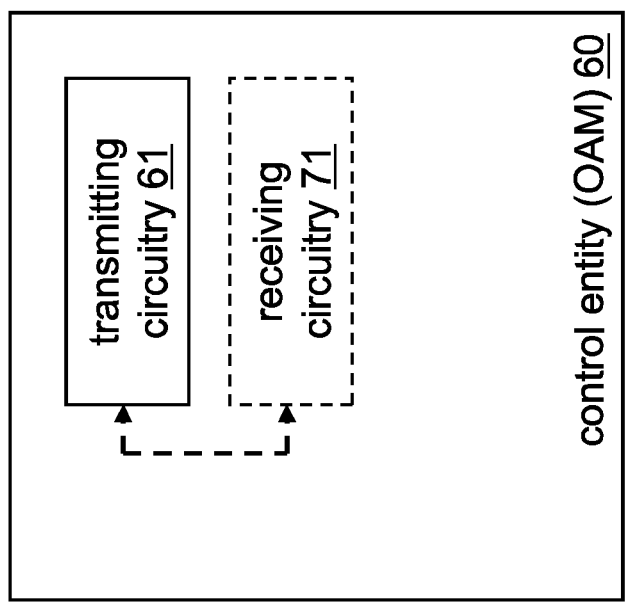
FIG. 7 is a block diagram illustrating an apparatus according to example embodiments.

FIG. 7 is a block diagram illustrating an apparatus according to example embodiments. In particular, FIG. 7 illustrates a variation of the apparatus shown in FIG. 6. The apparatus according to FIG. 7 may thus further comprise a receiving circuitry 71.

In an embodiment at least some of the functionalities of the apparatus shown in FIG. 6 (or 7) may be shared between two physically separate devices forming one operational entity. Therefore, the apparatus may be seen to depict the operational entity comprising one or more physically separate devices for executing at least some of the described processes.

According to further example embodiments, said network entity profile information includes a respective network entity profile for each of said at least one network entity, and wherein said respective network entity profile comprises at least one profile attribute.

According to further example embodiments, said network entity profile information is transmitted utilizing a hypertext transfer protocol PUT method.

According to further example embodiments, said network entity profile information comprises network entity profile template information, wherein said network entity profile template information comprises a network entity profile template including an identifier of said network entity profile template and a profile content of said network entity profile template, said profile content including at least one profile attribute, and said network entity profile information comprises respective information on network entity specific changes to said network entity profile template with respect to said at least one network entity.

According to a variation of the procedure shown in FIG. 15, exemplary additional operations are given, which are inherently independent from each other as such. According to such variation, an exemplary method according to example embodiments may comprise an operation of transmitting, towards said network repository function entity, network entity profile update information including template specific changes to said network entity profile template.

According to further example embodiments, said network entity profile information is transmitted utilizing a hypertext transfer protocol PUT method.

Alternatively, or in addition, according to further example embodiments, said network entity profile update information is transmitted utilizing a hypertext transfer protocol PUT or PATCH method.

Alternatively, or in addition, according to further example embodiments, said template specific changes are provided in said network entity profile update information utilizing JavaScript object notation PATCH or JavaScript object notation MERGE PATCH.

According to a variation of the procedure shown in FIG. 15, exemplary additional operations are given, which are inherently independent from each other as such. According to such variation, an exemplary method according to example embodiments may comprise an operation of receiving, from said network repository function entity, network entity profile template identifier error information indicating that said identifier included in said network entity profile information is unknown.

According to a variation of the procedure shown in FIG. 15, exemplary additional operations are given, which are inherently independent from each other as such. According to such variation, an exemplary method according to example embodiments may comprise an operation of transmitting, towards a network entity of said at least one network entity, a network entity registration configuration, wherein said network entity registration configuration comprises an identifier of said network entity and address information of said network repository function entity.

According to further example embodiments, said control entity is an operations, administration and maintenance entity.

Figure 8:
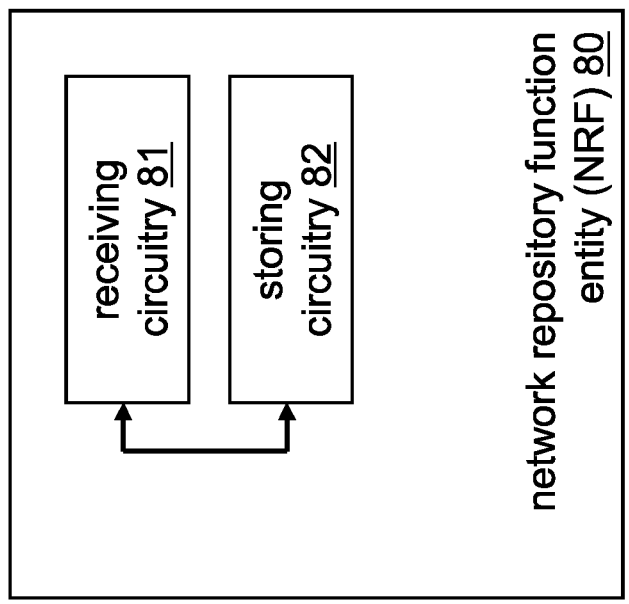
FIG. 8 is a block diagram illustrating an apparatus according to example embodiments.
Figure 16:
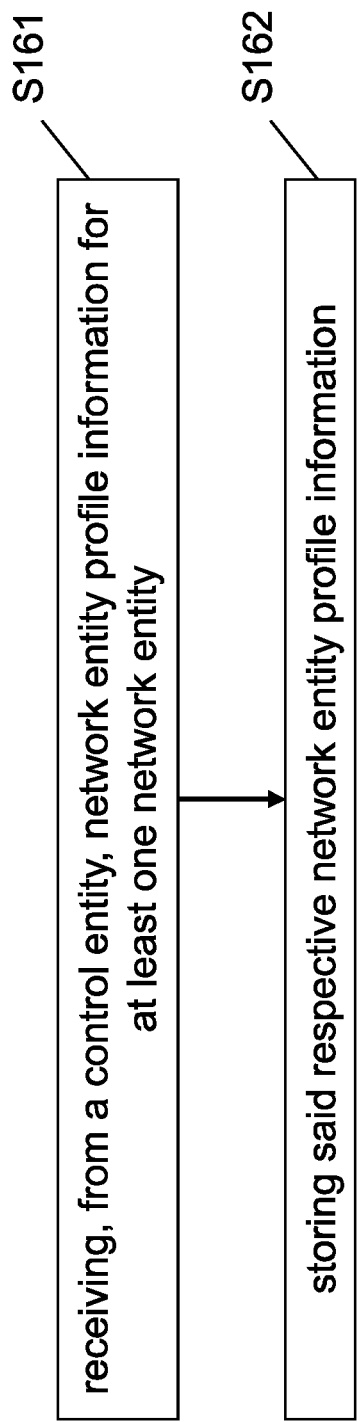
FIG. 16 is a schematic diagram of a procedure according to example embodiments.

FIG. 8 is a block diagram illustrating an apparatus according to example embodiments. The apparatus may be a network function repository entity 80 such as an NRF comprising a receiving circuitry 81 and a storing circuitry 82. The receiving circuitry 81 receives, from a control entity, network entity profile information for at least one network entity. The storing circuitry 82 stores said respective network entity profile information. FIG. 16 is a schematic diagram of a procedure according to example embodiments. The apparatus according to FIG. 8 may perform the method of FIG. 16 but is not limited to this method. The method of FIG. 16 may be performed by the apparatus of FIG. 8 but is not limited to being performed by this apparatus.

As shown in FIG. 16, a procedure according to example embodiments comprises an operation of receiving (S161), from a control entity, network entity profile information for at least one network entity, and an operation of storing (S162) said respective network entity profile information.

Figure 9:
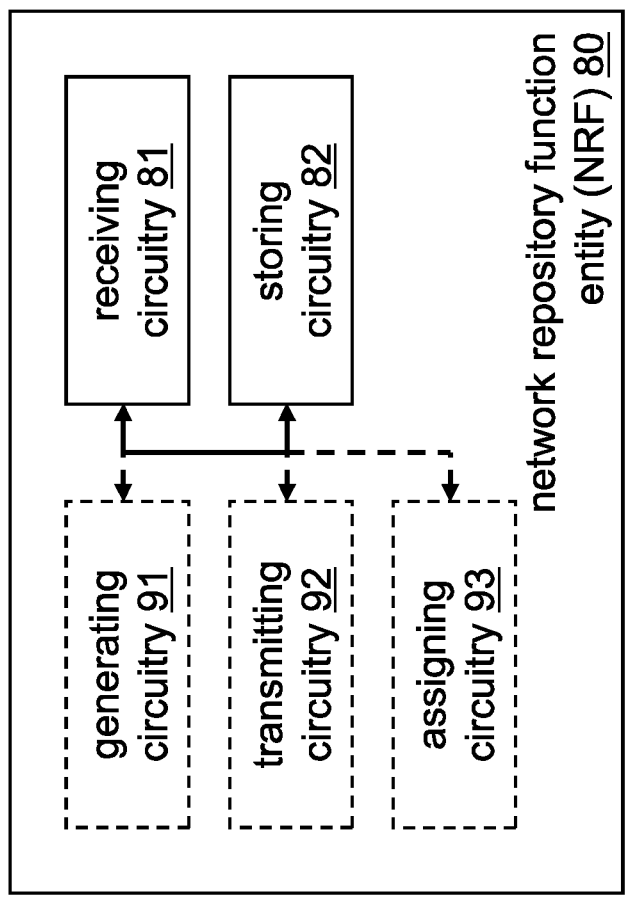
FIG. 9 is a block diagram illustrating an apparatus according to example embodiments.

FIG. 9 is a block diagram illustrating an apparatus according to example embodiments. In particular, FIG. 9 illustrates a variation of the apparatus shown in FIG. 8. The apparatus according to FIG. 9 may thus further comprise a generating circuitry 91, a transmitting circuitry 92, and/or an assigning circuitry 93.

In an embodiment at least some of the functionalities of the apparatus shown in FIG. 8 (or 9) may be shared between two physically separate devices forming one operational entity. Therefore, the apparatus may be seen to depict the operational entity comprising one or more physically separate devices for executing at least some of the described processes.

According to further example embodiments, said network entity profile information includes a respective network entity profile for each of said at least one network entity, and wherein said respective network entity profile comprises at least one profile attribute.

According to further example embodiments, said network entity profile information is received utilizing a hypertext transfer protocol PUT method.

According to further example embodiments, said network entity profile information comprises network entity profile template information, wherein said network entity profile template information comprises a network entity profile template including an identifier of said network entity profile template and a profile content of said network entity profile template, said profile content including at least one profile attribute, and said network entity profile information comprises respective information on network entity specific changes to said network entity profile template with respect to said at least one network entity.

According to a variation of the procedure shown in FIG. 16, exemplary additional operations are given, which are inherently independent from each other as such. According to such variation, an exemplary method according to example embodiments may comprise an operation of receiving, from said control entity, network entity profile update information including template specific changes to said network entity profile template.

According to further example embodiments, said network entity profile information is received utilizing a hypertext transfer protocol PUT method.

Alternatively, or in addition, according to further example embodiments, said network entity profile update information is received utilizing a hypertext transfer protocol PUT or PATCH method.

Alternatively, or in addition, according to further example embodiments, said template specific changes are provided in said network entity profile update information utilizing JavaScript object notation PATCH or JavaScript object notation MERGE PATCH.

According to a variation of the procedure shown in FIG. 16, exemplary additional operations are given, which are inherently independent from each other as such. According to such variation, an exemplary method according to example embodiments may comprise an operation of generating an updated network entity profile template as said network entity profile template based on said network entity profile template and said template specific changes to said network entity profile template.

According to a variation of the procedure shown in FIG. 16, exemplary additional operations are given, which are inherently independent from each other as such. According to such variation, an exemplary method according to example embodiments may comprise an operation of transmitting, towards said control entity, network entity profile template identifier error information indicating that said identifier included in said network entity profile information is unknown.

According to a variation of the procedure shown in FIG. 16, exemplary additional operations are given, which are inherently independent from each other as such. According to such variation, an exemplary method according to example embodiments may comprise an operation of generating a respective network entity profile for said at least one network entity based on said network entity profile template and said respective information on network entity specific changes to said network entity profile template with respect to said at least one network entity, and an operation of storing said respective network entity profile.

According to a variation of the procedure shown in FIG. 16, exemplary additional operations are given, which are inherently independent from each other as such. According to such variation, an exemplary method according to example embodiments may comprise an operation of receiving, from a network entity, a network entity registration request comprising an identifier of said network entity, and an operation of assigning said network entity profile generated for said network entity to said network entity based on said identifier of said network entity.

According to further example embodiments, said network entity registration request is received utilizing a hypertext transfer protocol PUT method.

According to a variation of the procedure shown in FIG. 16, exemplary additional operations are given, which are inherently independent from each other as such. According to such variation, an exemplary method according to example embodiments may comprise an operation of transmitting, towards said network entity, said network entity profile assigned to said network entity.

According to a variation of the procedure shown in FIG. 16, exemplary additional operations are given, which are inherently independent from each other as such. According to such variation, an exemplary method according to example embodiments may comprise an operation of receiving, from said network entity, an inquiry with respect to features supported by said network repository function entity, and an operation of transmitting, towards said network entity, information indicative of that network entity profile templates are supported by said network repository function entity.

Figure 10:
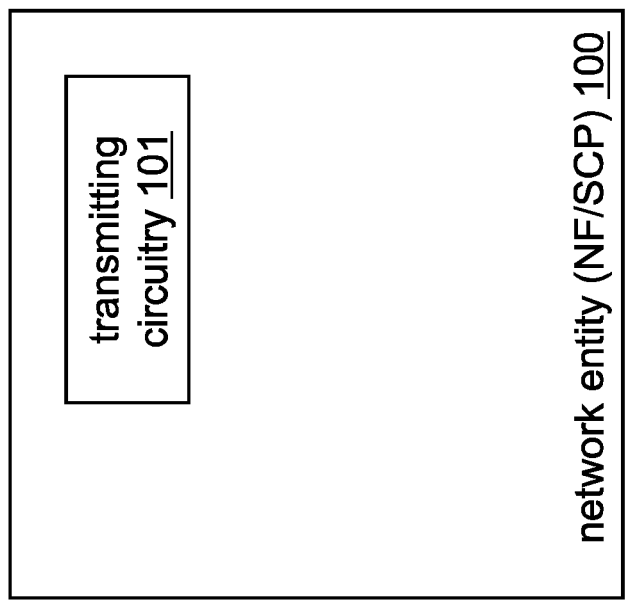
FIG. 10 is a block diagram illustrating an apparatus according to example embodiments.
Figure 17:
FIG. 17 is a schematic diagram of a procedure according to example embodiments.
Figure 18:
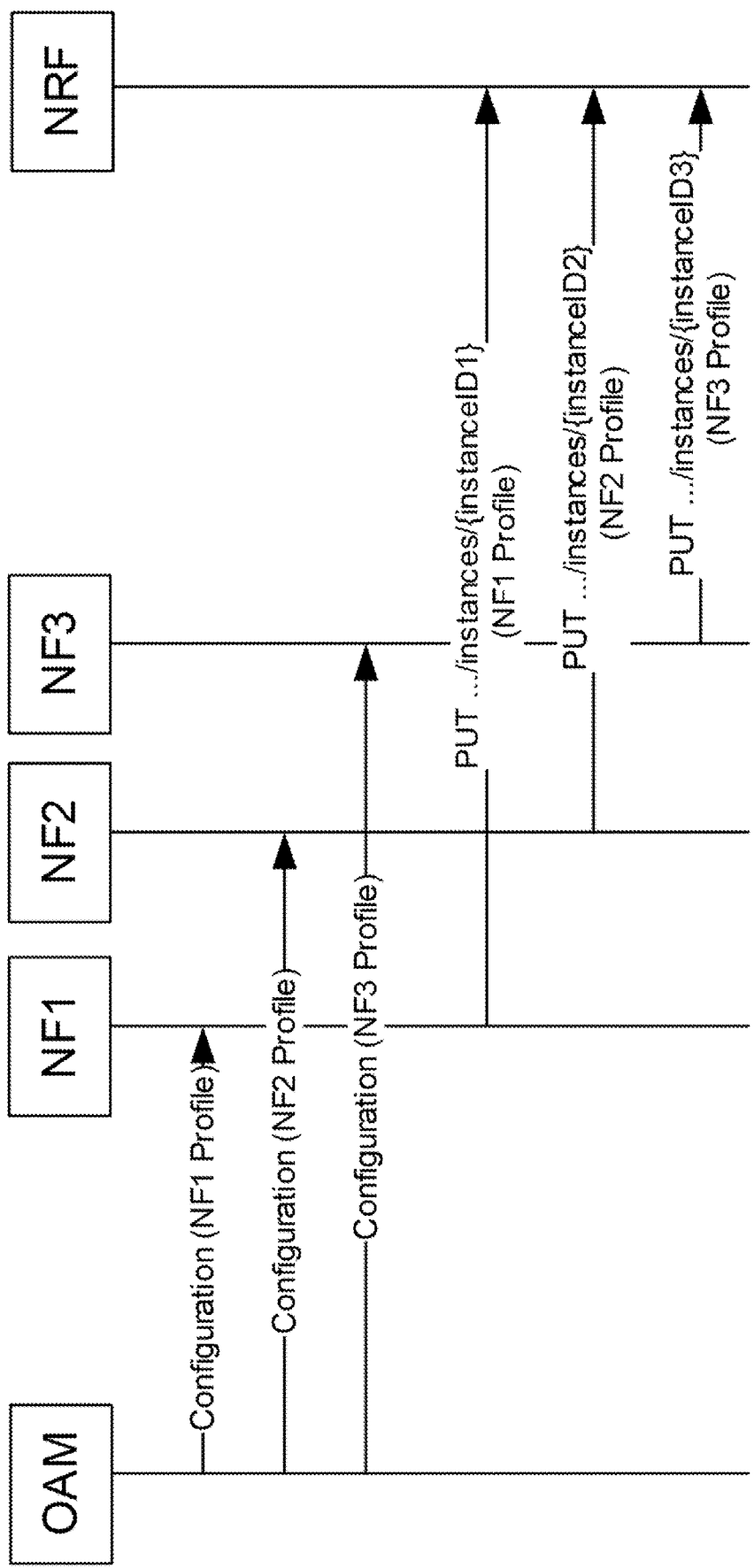
FIG. 18 shows a schematic diagram of signaling sequences for configuring and registering profiles of network functions.

FIG. 10 is a block diagram illustrating an apparatus according to example embodiments. The apparatus may be a network entity 100 such as a network function (entity) (NF) or service communication proxy (entity) (SCP) comprising a transmitting circuitry 101. The transmitting circuitry 101 transmits, towards a network repository function entity, a network entity registration request comprising an identifier of said network entity 100. FIG. 17 is a schematic diagram of a procedure according to example embodiments. The apparatus according to FIG. 10 may perform the method of FIG. 17 but is not limited to this method. The method of FIG. 17 may be performed by the apparatus of FIG. 10 but is not limited to being performed by this apparatus.

As shown in FIG. 17, a procedure according to example embodiments comprises an operation of transmitting (S171), towards a network repository function entity, a network entity registration request comprising an identifier of said network entity.

Figure 11:
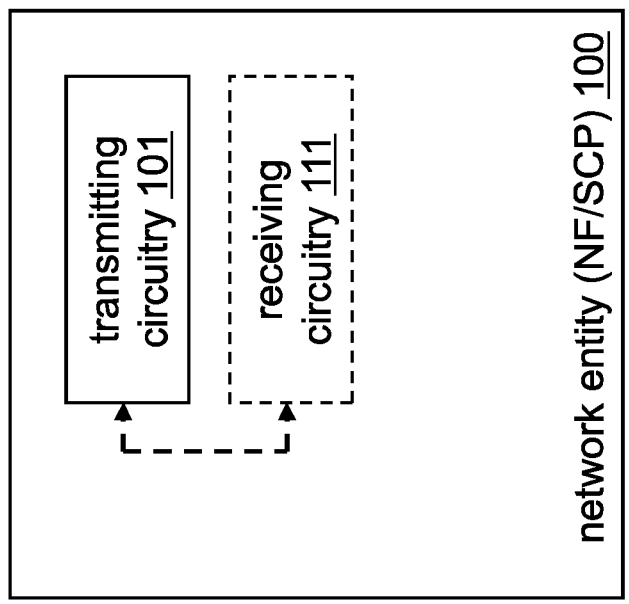
FIG. 11 is a block diagram illustrating an apparatus according to example embodiments.

FIG. 11 is a block diagram illustrating an apparatus according to example embodiments. In particular, FIG. 11 illustrates a variation of the apparatus shown in FIG. 10. The apparatus according to FIG. 11 may thus further comprise a receiving circuitry 111.

In an embodiment at least some of the functionalities of the apparatus shown in FIG. 10 (or 11) may be shared between two physically separate devices forming one operational entity. Therefore, the apparatus may be seen to depict the operational entity comprising one or more physically separate devices for executing at least some of the described processes.

According to a variation of the procedure shown in FIG. 17, exemplary additional operations are given, which are inherently independent from each other as such. According to such variation, an exemplary method according to example embodiments may comprise an operation of receiving, from a control entity, a network entity registration configuration, wherein said network entity registration configuration comprises said identifier of said network entity and address information of said network repository function entity.

According to further example embodiments, said network entity registration request is transmitted utilizing a hypertext transfer protocol PUT method.

According to a variation of the procedure shown in FIG. 17, exemplary additional operations are given, which are inherently independent from each other as such. According to such variation, an exemplary method according to example embodiments may comprise an operation of receiving, from said network repository function entity, a network entity profile assigned to said network entity.

According to a variation of the procedure shown in FIG. 17, exemplary additional operations are given, which are inherently independent from each other as such. According to such variation, an exemplary method according to example embodiments may comprise an operation of transmitting, towards said network repository function entity, an inquiry with respect to features supported by said network repository function entity, and an operation of receiving, from said network repository function entity, information indicative of that network entity profile templates are supported by said network repository function entity.

According to further example embodiments, said network entity is a network function entity or a service communication proxy entity.

In the following, example embodiments are explained in more specific terms.

According to exemplary embodiments of the first approach, NFs/SCPs register themselves to an NRF utilizing profile template IDs.

Heretofore, according to the example embodiments, profile templates are configured in the NRF via an OAM.

According to example embodiments, profile templates have the same contents as the normal NF profiles stored in the NRF. However, profile templates may apply for multiple NFs/SCPs.

The content of an exemplary profile template according to example embodiments is provided below. The content is defined by means of "'parameter'='value'" pairs.

According to example embodiments, the profile template includes a profile template identifier ("ProfileTemplateID") as well as the profile content of the profile template ("ProfileTemplateContents: . . . ").

ProfileTemplateID: 1
ProfileTemplateContents:

-continued

```
nfType=SMF
plmnList={PLMN1}
snpnList={ }
plmnList={PLMN1,PLMN2}
allowedNfTypes={AMF,UDM,NEF}
sNssais={NSSAI1,NSSAI2}
allowedNFDomains{xx,yy}
capacity=x
nfServices={
  { serviceName=x, serviceInstanceID=1, versions={1,2}, scheme=https,
    supportedFeatures=xyz, nfServiceSetIdList={1} },
  { serviceName=x, serviceInstanceID=2, versions={1,2}, scheme=https,
    supportedFeatures=xyz, nfServiceSetIdList={1} },
  { serviceName=y, serviceInstanceID=3, versions={1}, scheme=https,
    supportedFeatures=abc, nfServiceSetIdList={2}
```

According to example embodiments, these profile templates (identified by the profile template identifier) are configured in the NRF via an OAM. To enable the configuration of profile templates at the NRF, e.g. by OAM, a new resource is added.

Figure 19:
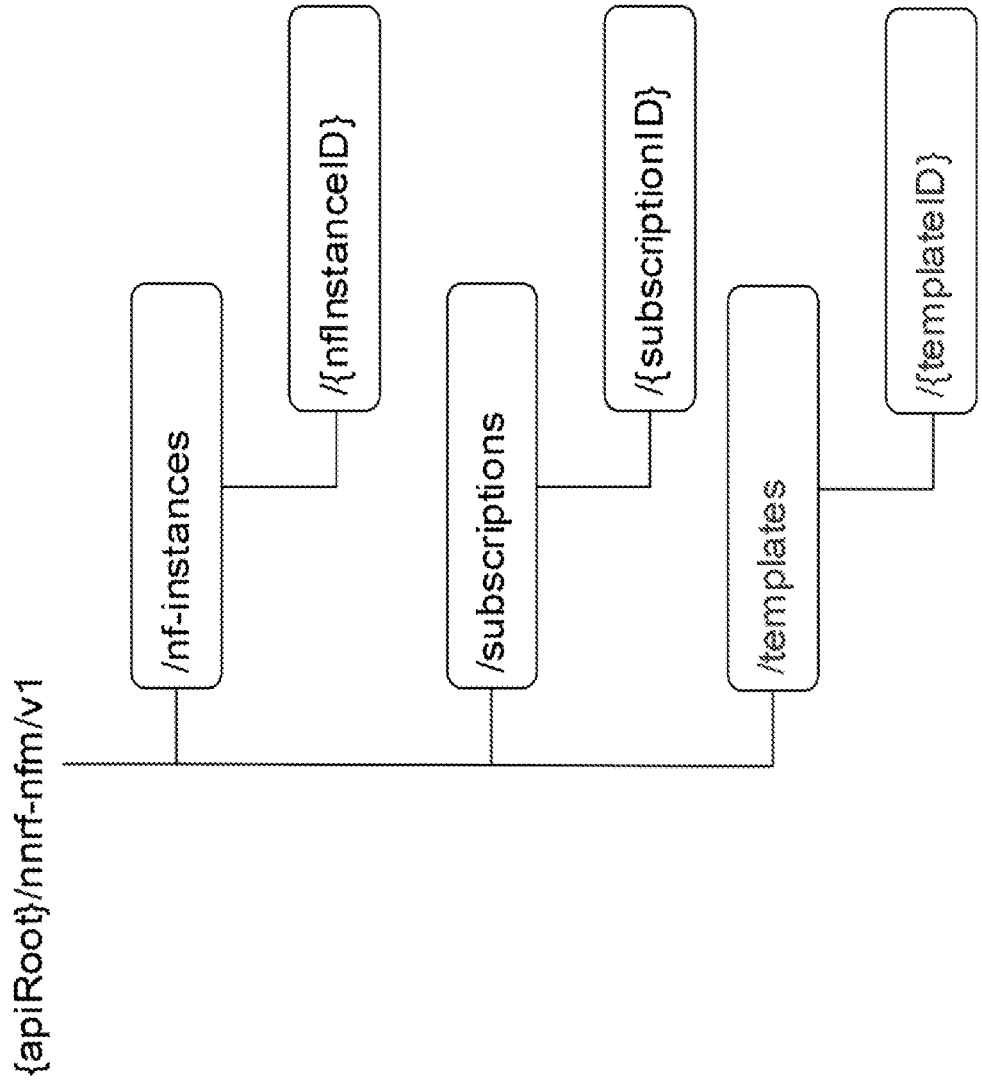
FIG. 19 is a schematic diagram illustrating a resource structure according to example embodiments.

FIG. 19 is a schematic diagram illustrating a resource structure according to example embodiments.

According to the example embodiments, the entry "/templates" is added to the resource structure, and the sub-entry "/{templateID}" is added to the entry "/templates" in the resource structure.

Here, it is noted that the names of the entries and sub-entries added to the resource structure as explained above are not limiting and may be modified without deviating from the present disclosure.

According to example embodiments, templates can be registered via the HTTP PUT method, read via the HTTP GET method, deleted via the HTTP DELETE method, and/or updated via the HTTP PUT or PATCH methods.

Figure 20:
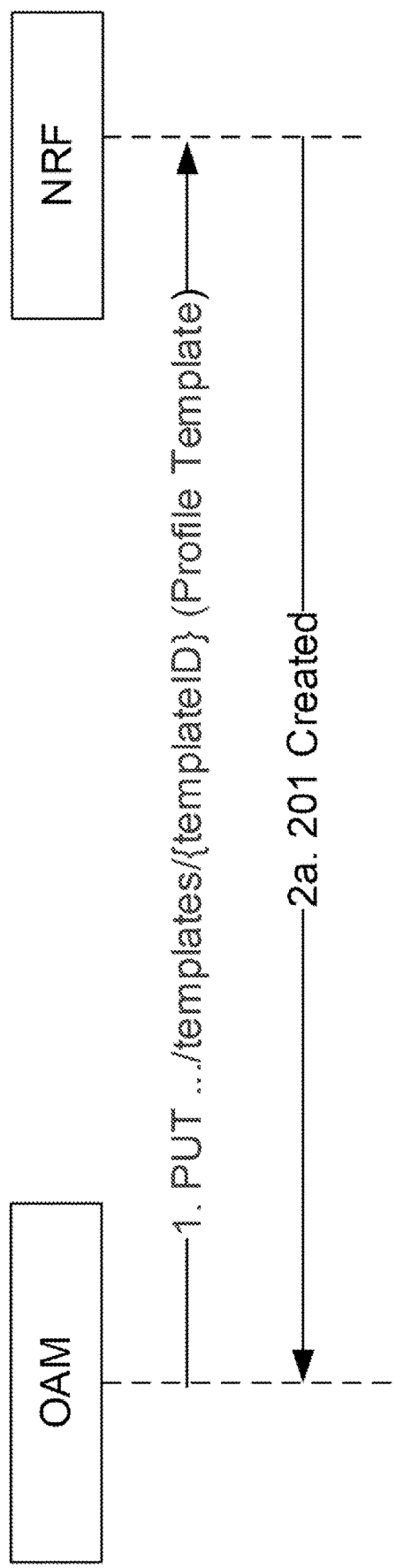
FIG. 20 shows a schematic diagram of signaling sequences according to example embodiments.

FIG. 20 shows a schematic diagram of signaling sequences according to example embodiments.

In particular, FIG. 20 shows an example call flow of a registration of profile templates at the NRF.

Heretofore, in a step 1 of FIG. 20, the OAM transmits the profile template to the NRF while indicating the profile template identifier.

In a step 2a of FIG. 20, the NRF responds with an acknowledgement.

According to example embodiments, the access to the resources for templates is restricted, e.g. to be only allowed for the OAM.

Furthermore, according to example embodiments of the first approach, the NFs/SCPs register at the NRF using a profile template identifier.

Figure 21:
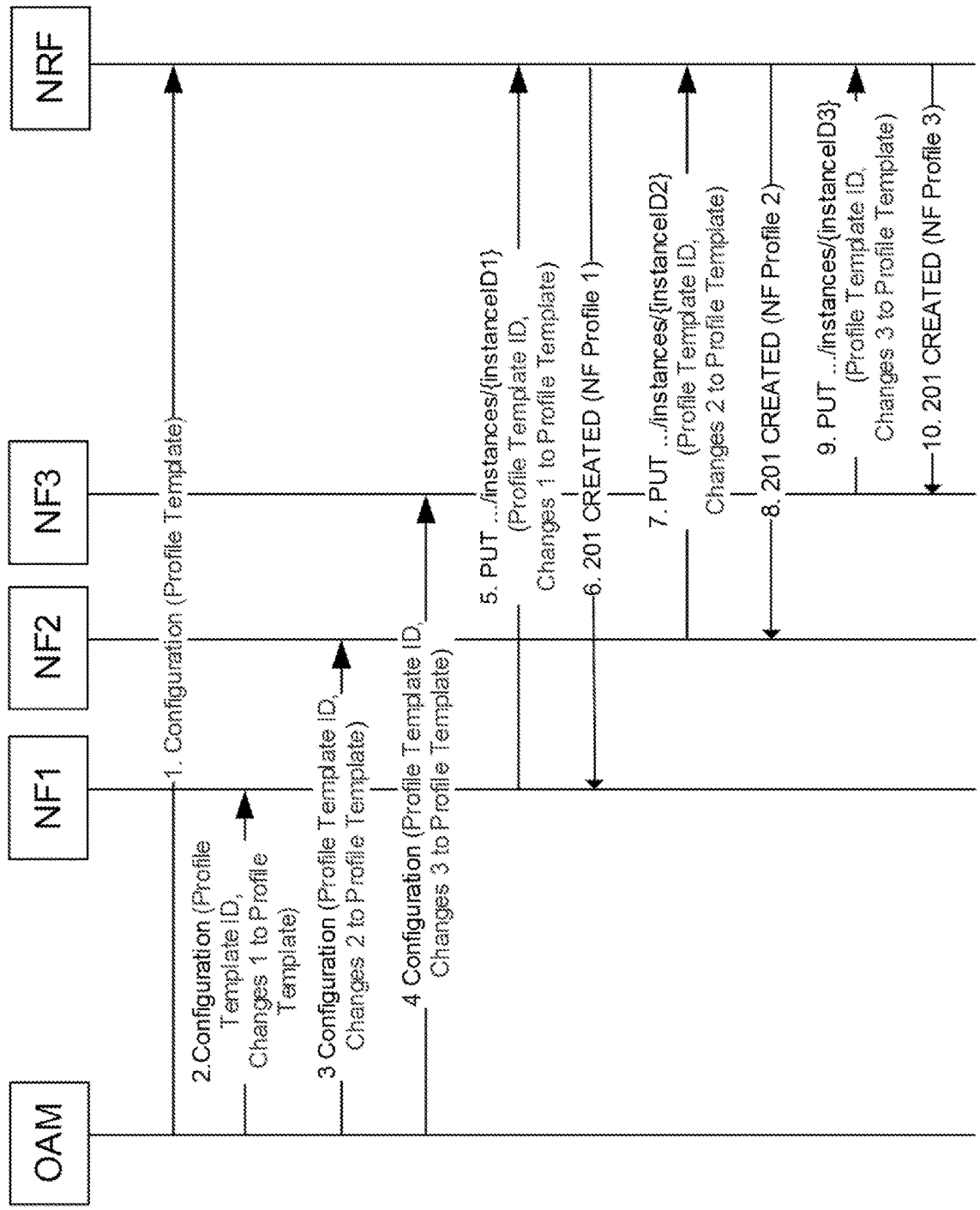
FIG. 21 shows a schematic diagram of signaling sequences according to example embodiments.

FIG. 21 shows a schematic diagram of signaling sequences according to example embodiments.

In a step 1 of FIG. 21, an OAM configures one or more profile templates at an NRF.

In steps 2 to 4 of FIG. 21, the OAM configures NFs (or SCPs) with a profile template ID (corresponding to a profile configured at the NRF) and with changes to/over the profile template.

In steps 5, 7, and 9 of FIG. 21, the thus configured NFs (or SCPs) register at the NRF with the profile template ID (corresponding to a profile configured at the NRF) and with the changes to/over the profile template as configured by the OAM in steps 2 to 4.

In steps 6, 8, and 10 of FIG. 21, the NRF responds with respective acknowledgements.

In other words, an NF or SCP is configured with profile template ID and provides this during registration with the NRF.

According to example embodiments, the profile template ID and possible additional attributes for the NF profile are configured at the NF or SCP via an OAM.

During the registration, the NF or SCP can provide attributes for its NF profile that are added or overwrite attributes in the profile template.

The NF or SCP may provide attributes as obtained from the OAM and/or add additional attributes not related to configuration, e.g. dynamic parameters like load, heartbeat timers etc. in registration or subsequent registration updates.

According to example embodiments, JavaScript object notation (JSON) PATCH (IETF RFC 6902) or JSON MERGE PATCH (IETF RFC 7396) is used in the registration request to describe such changes to the profile template.

When receiving such a registration request, the NRF according to example embodiments constructs the NF or SCP profile of the registering NF or SCP by combining the stored profile template with the additional attributes. If an attribute is provided as additional attribute and is also contained in the profile template in the NRF, the additional attribute contents are used.

According to example embodiments, the NRF provides the full NF or SCP profile in the reply (e.g. steps 6, 8, and 10 of FIG. 21) to the registration and thus makes the SCP or NF aware of extra parameters in the profile that may be necessary for the operation of the SCP or NRF.

According to example embodiments, the NRF does not return the full NF or SCP profile to save messages sizes.

According to example embodiments, application error information is provided to indicate that an unknown profile template ID or an unknown profile template name was received upon such occurrences.

According to example embodiments, application error information is provided to indicate that additional attributes did not match the indicated profile template (e.g. attributes only applicable for another NF type) upon such occurrences.

A supported feature for supporting profile templates can be defined. This enables an NF or SCP to detect whether the NRF supports profile templates before registering. Thus, according to example embodiments, the NF or SCP can inquire supported features of the NRF by issuing an HTTP OPTIONS request to the "nf-instances" resource. According to example embodiments, the NRF indicates in the response the supported features it can provide, potentially including information that the NRF supports profile templates.

Figure 22:
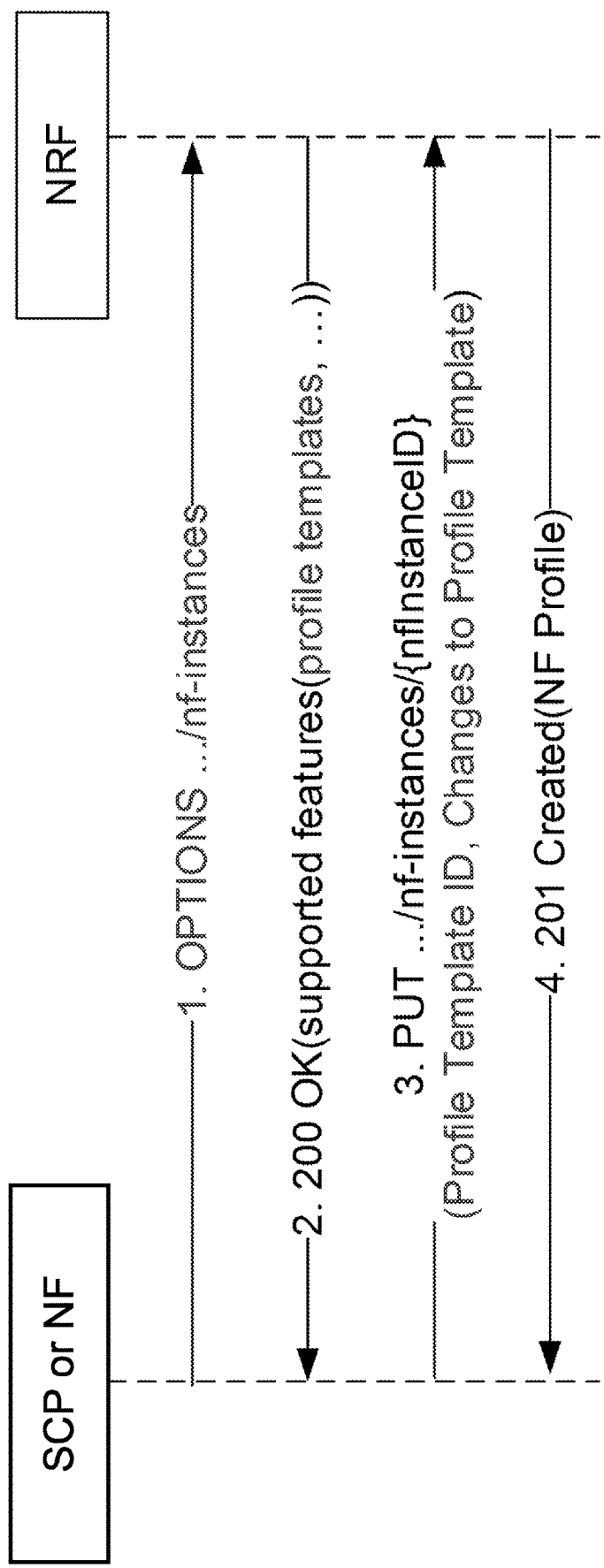
FIG. 22 shows a schematic diagram of signaling sequences according to example embodiments.

FIG. 22 shows a schematic diagram of signaling sequences according to example embodiments.

In a step 1 of FIG. 22, the NF or SCP inquires supported features of the NRF by issuing an HTTP OPTIONS request to the "nf-instances" resource.

In a step 2 of FIG. 22, the NRF responds with information on features supported by the NRF, including information that the NRF supports profile templates.

In response thereto, the NF or SCP registers (step 3 of FIG. 22) using the profile template identifier according to example embodiments as explained above, and the NRF responds (step 4 of FIG. 22) with an acknowledgement.

If the features supported by the NRF would not include information that the NRF supports profile templates, the NF or SCP may register not using the profile template identifier according to the example embodiments as explained above.

According to exemplary embodiments of the second approach, NFs/SCPs register themselves to an NRF utilizing NF/SCP IDs.

Heretofore, according to the example embodiments, NF/SCP profiles are configured in the NRF via an OAM.

According to one option, the NRF is configured via OAM with complete NF or SCP profiles.

According to another option, the OAM provides profile template(s) and changes to these profile template(s) (delta profiles) for individual NFs/SCPs, and the NRF generates the complete NF or SCP profiles based thereon.

In any way (in either option), the NRF is (finally) provided with complete NF/SCP profiles.

According to example embodiments, these profile templates (identified by the profile template identifier) and the changes to these profile template(s) (delta profiles) are configured in the NRF via an OAM. To enable the configuration of profile templates and delta profiles (for individual NFs or SCPs) at the NRF, e.g. by OAM, new resources are added.

Figure 23:
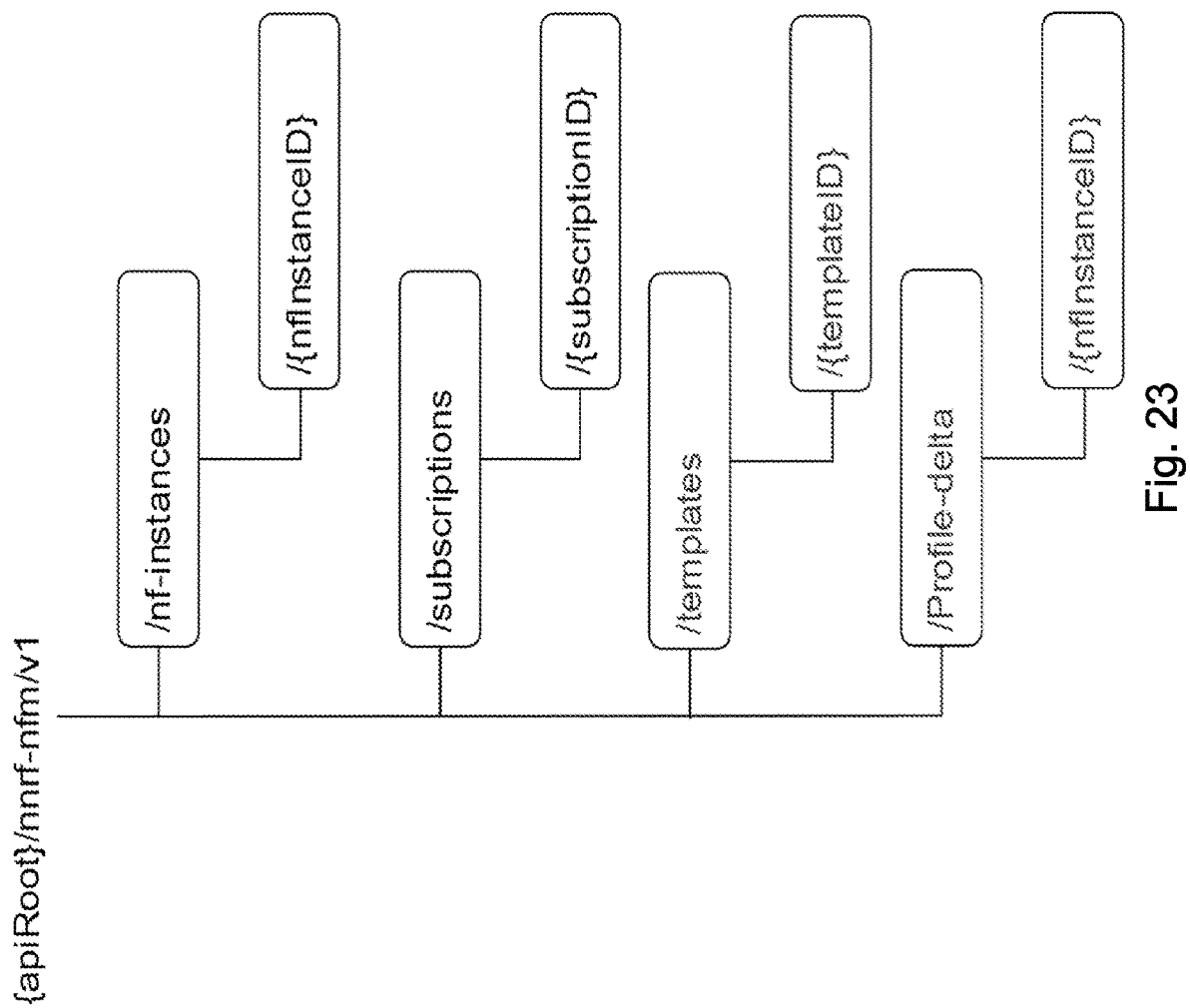
FIG. 23 is a schematic diagram illustrating a resource structure according to example embodiments.

FIG. 23 is a schematic diagram illustrating a resource structure according to example embodiments.

According to the example embodiments, the entry "/templates" is added to the resource structure, and the sub-entry "/{templateID}" is added to the entry "/templates" in the resource structure.

Further, according to example embodiments, the entry "/Profile-delta" is added to the resource structure, and the sub-entry "/{nfInstanceID}" is added to the entry "/Profile-delta" in the resource structure.

Here, it is noted that the names of the entries and sub-entries added to the resource structure as explained above are not limiting and may be modified without deviating from the present disclosure.

According to example embodiments, templates can be registered via the HTTP PUT method, read via the HTTP GET method, deleted via the HTTP DELETE method, and/or updated via the HTTP PUT or PATCH methods.

Figure 24:
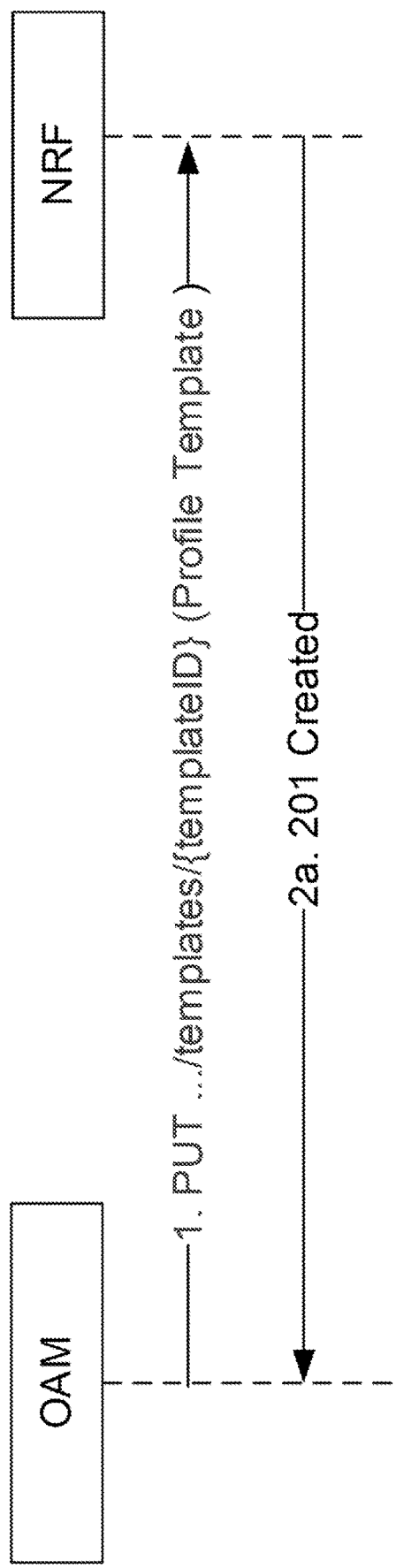
FIG. 24 shows a schematic diagram of signaling sequences according to example embodiments.

FIG. 24 shows a schematic diagram of signaling sequences according to example embodiments.

In particular, FIG. 24 shows an example call flow of a registration of profile templates at the NRF.

Heretofore, in a step 1 of FIG. 24, the OAM transmits the profile template to the NRF while indicating the profile template identifier.

In a step 2a of FIG. 24, the NRF responds with an acknowledgement.

According to example embodiments, templates can be registered via the HTTP PUT method, read via the HTTP GET method, deleted via the HTTP DELETE method, and/or updated via the HTTP PUT or PATCH methods.

Profile updates (updates to profile templates (delta profiles)) can be registered via the HTTP PUT method, read via the HTTP GET method, deleted via the HTTP DELETE method, and/or updated via the HTTP PUT or PATCH methods.

Figure 25:
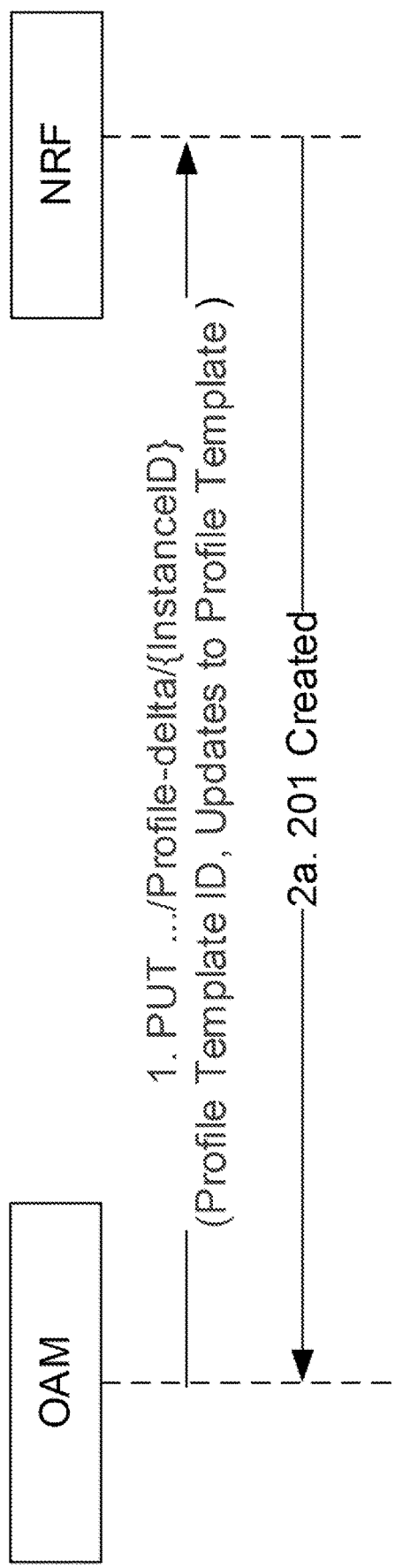
FIG. 25 shows a schematic diagram of signaling sequences according to example embodiments.

FIG. 25 shows a schematic diagram of signaling sequences according to example embodiments.

In particular, FIG. 25 shows an example call flow of a registration of updates to profile templates for individual NFs or SCPs at the NRF.

Heretofore, in a step 1 of FIG. 25, the OAM transmits the individual updates to the profile template to the NRF while indicating the profile template identifier and an identifier of the individual NF/SCP.

In a step 2a of FIG. 25, the NRF responds with an acknowledgement.

According to example embodiments, JSON PATCH (IETF RFC 6902) or JSON MERGE PATCH (IETF RFC 7396) is used to describe such changes to the profile template.

According to example embodiments, the access to the resources for templates and profile updates is be restricted, e.g. to be only allowed for an OAM.

According to example embodiments, the NF or SCP is configured with its own instance/set ID and with an address of the NRF to contact (i.e., the NRF the OAM has configured) and provides this information during registration.

Furthermore, according to example embodiments of the second approach, the NFs/SCPs register at the NRF using an NF/SCP identifier.

In particular, an NF or SCP registers at the NRF with an NF/SCP ID (without full NF profile parameters to reduce the NF profile size). The NF or SCP may add information about parameters not related to configuration, e.g. load or heartbeat, in registration or subsequent registration updates.

Figure 26:
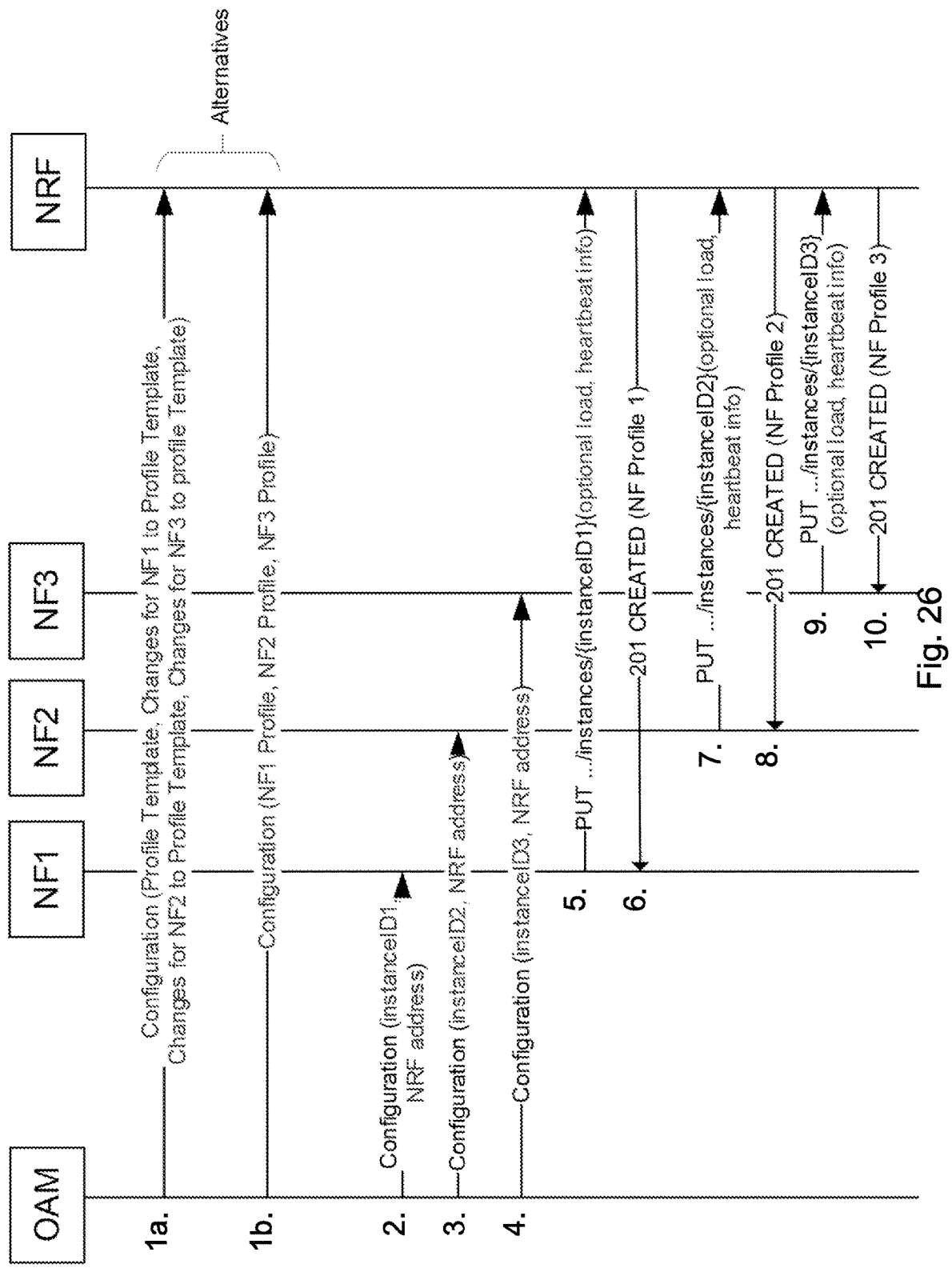
FIG. 26 shows a schematic diagram of signaling sequences according to example embodiments.

FIG. 26 shows a schematic diagram of signaling sequences according to example embodiments.

In a step 1a of FIG. 26, an OAM configures a profile template and one or more delta profiles corresponding to one or more NFs/SCPs ("Changes for NF1 to Profile Template", "Changes for NF2 to Profile Template", "Changes for NF3 to Profile Template") at an NRF.

When receiving such a configuration, the NRF according to example embodiments constructs the NF or SCP profiles by combining the profile template with the provided changes according to the above-explained principles.

In an alternative step 1b of FIG. 26, an OAM configures one or more NF/SCP profiles ("NF1 Profile", "NF2 Profile", "NF3 Profile") at the NRF.

In steps 2 to 4 of FIG. 26, the OAM configures NFs (or SCPs) with an instance ID (corresponding to the respective NF/SCP (e.g. NF/SCP identifier)) and with an address of the NRF to be contacted.

In steps 5, 7, and 9 of FIG. 26, the thus configured NFs (or SCPs) register at the NRF with the instance ID (corresponding to the respective NF/SCP (e.g. NF/SCP identifier)) and potentially with additional information such as load data or heartbeat information.

When receiving such a registration request, the NRF selects the NF or SCP profile based on the received NF or SCP ID.

In steps 6, 8, and 10 of FIG. 26, the NRF responds with respective acknowledgements.

According to example embodiments, when receiving the registration request, the NRF selects the NF or SCP profile based on the received NF or SCP ID and provides the NF/SCP profile in the reply to the registration and thus makes the SCP or NF aware of extra parameters in the profile that may be necessary for the operation of the SCP or NRF.

According to example embodiments, application error information is provided to indicate that an unknown profile template ID or an unknown profile template name was received upon such occurrences.

A supported feature for supporting registration via (instance/NF/SCP) ID can be defined. This enables an NF or SCP to detect whether the NRF supports profile registration via (instance/NF/SCP) ID before registering. Thus, according to example embodiments, the NF or SCP can inquire supported features of the NRF by issuing an HTTP OPTIONS request to the "nf-instances" resource. According to example embodiments, the NRF indicates in the response the supported features it can provide, potentially including information that the NRF supports profile registration via (instance/NF/SCP) ID.

Figure 27:
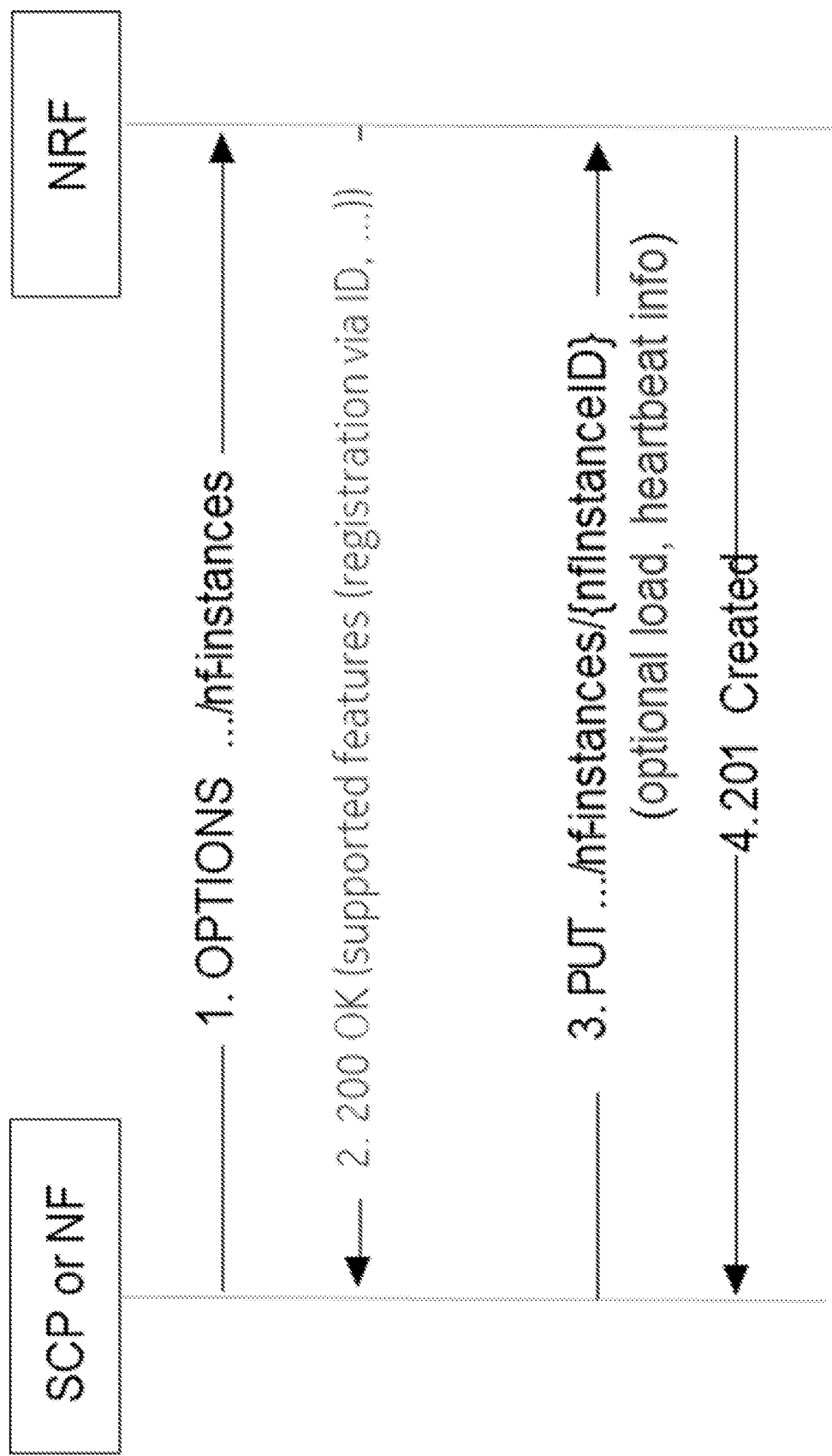
FIG. 27 shows a schematic diagram of signaling sequences according to example embodiments.

FIG. 27 shows a schematic diagram of signaling sequences according to example embodiments.

In a step 1 of FIG. 27, the NF or SCP inquires supported features of the NRF by issuing an HTTP OPTIONS request to the "nf-instances" resource.

In a step 2 of FIG. 27, the NRF responds with information on features supported by the NRF, including information that the NRF supports registration via (instance/NF/SCP) ID.

In response thereto, the NF or SCP registers (step 3 of FIG. 27) using the instance ID (corresponding to the NF/SCP, e.g., NF/SCP ID) according to example embodiments as explained above (potentially including optional load information, heartbeat information), and the NRF responds (step 4 of FIG. 27) with an acknowledgement.

If the features supported by the NRF would not include information that the NRF supports registration via (instance/NF/SCP) ID, the NF or SCP may register not using the instance (NF/SCP) ID according to the example embodiments as explained above.

According to example embodiments as explained above, the configuration effort for OAMs is lessened.

Further, according to example embodiments as explained above, registration messages are made smaller.

Further, according to example embodiments as explained above, registration of profiles in the NRF is simplified.

Further, according to example embodiments as explained above, the risk of misconfiguration is reduced.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 28:
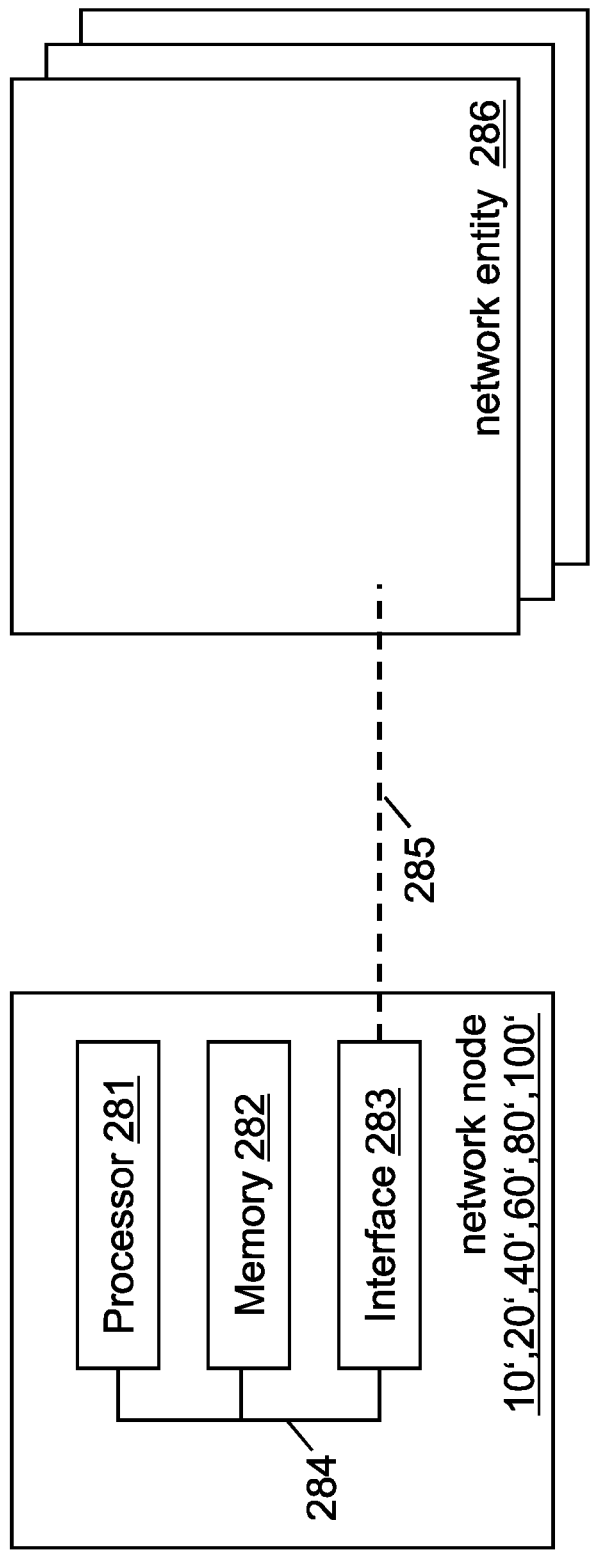
FIG. 28 is a block diagram alternatively illustrating apparatuses according to example embodiments.

In FIG. 28, an alternative illustration of apparatuses according to example embodiments is depicted. As indicated in FIG. 28, according to example embodiments, the apparatus (network node) 10' (corresponding to the control entity 10) comprises a processor 281, a memory 282 and an interface 283, which are connected by a bus 284 or the like. Further, as indicated in FIG. 28, according to example embodiments, the apparatus (network node) 20' (corresponding to the network repository function entity 20) comprises a processor 281, a memory 282 and an interface 283, which are connected by a bus 284 or the like. Further, as indicated in FIG. 28, according to example embodiments, the apparatus (network node) 40' (corresponding to the network entity 40) comprises a processor 281, a memory 282 and an interface 283, which are connected by a bus 284 or the like. Further, as indicated in FIG. 28, according to example embodiments, the apparatus (network node) 60' (corresponding to the control entity 60) comprises a processor 281, a memory 282 and an interface 283, which are connected by a bus 284 or the like. Further, as indicated in FIG. 28, according to example embodiments, the apparatus (network node) 80' (corresponding to the network repository function entity 80) comprises a processor 281, a memory 282 and an interface 283, which are connected by a bus 284 or the like. Further, as indicated in FIG. 28, according to example embodiments, the apparatus (network node) 100' (corresponding to the network entity 100) comprises a processor 281, a memory 282 and an interface 283, which are connected by a bus 284 or the like. The apparatus (network node) 10',20',40',60',80',100' (corresponding to the control entity 10 or network repository function entity 20 or network entity 40 or control entity 60 or network repository function entity 80 or network entity 100) may be connected via link 285 to another apparatus(es) 286, which may in turn be an apparatus (network node) 10',20',40',60',80',100' (corresponding to the control entity 10 or network repository function entity 20 or network entity 40 or control entity 60 or network repository function entity 80 or network entity 100).

The processor 281 and/or the interface 283 may also include a modem or the like to facilitate communication over a (hardware or wireless) link, respectively. The interface 283 may include a suitable transceiver coupled to one or more antennas or communication means for (hardwire or wireless) communications with the linked or connected device(s), respectively. The interface 283 is generally configured to communicate with at least one other apparatus, i.e. the interface thereof.

The memory 282 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node 10 (control entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform transmitting, towards a network repository function entity, network entity profile template information (thus the apparatus comprising corresponding means for transmitting), wherein said network entity profile template information comprises a network entity profile template including an identifier of said network entity profile template and a profile content of said network entity profile template, said profile content including at least one profile attribute.

According to further example embodiments, an apparatus representing the network node 20 (network repository function entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform receiving, from a control entity, network entity profile template information (thus the apparatus comprising corresponding means for receiving), to perform storing said network entity profile template information, wherein said network entity profile template information comprises a network entity profile template including an identifier of said network entity profile template and a profile content of said network entity profile template, said profile content including at least one profile attribute (thus the apparatus comprising corresponding means for storing), to perform receiving, from a network entity, a network entity registration request comprising said identifier of said network entity profile template (thus the apparatus comprising corresponding means for receiving), and to perform generating a network entity profile for said network entity based on said at least one profile attribute (thus the apparatus comprising corresponding means for generating).

According to further example embodiments, an apparatus representing the network node 40 (network entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform transmitting, towards a network repository function entity, a network entity registration request comprising an identifier of a network entity profile template (thus the apparatus comprising corresponding means for transmitting).

According to further example embodiments, an apparatus representing the network node 60 (control entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform transmitting, towards a network repository function entity, network entity profile information for at least one network entity (thus the apparatus comprising corresponding means for transmitting).

According to further example embodiments, an apparatus representing the network node 80 (network repository function entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform receiving, from a control entity, network entity profile information for at least one network entity (thus the apparatus comprising corresponding means for receiving), and to perform storing said respective network entity profile information (thus the apparatus comprising corresponding means for storing).

According to further example embodiments, an apparatus representing the network node 100 (network entity) comprises at least one processor 281, at least one memory 282 including computer program code, and at least one interface 283 configured for communication with at least another apparatus. The processor (i.e. the at least one processor 281, with the at least one memory 282 and the computer program code) is configured to perform transmitting, towards a network repository function entity, a network entity registration request comprising an identifier of said network entity (thus the apparatus comprising corresponding means for transmitting).

For further details regarding the operability/functionality of the individual apparatuses, reference is made to the above description in connection with any one of FIGS. 1 to 27, respectively.

For the purpose of the present disclosure as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for optimization of network function profile administration and registration. Such measures exemplarily comprise, at a network repository function entity, receiving, from a control entity, network entity profile template information, storing said network entity profile template information, wherein said network entity profile template information comprises a network entity profile template including an identifier of said network entity profile template and a profile content of said network entity profile template, said profile content including at least one profile attribute, receiving, from a network entity, a network entity registration request comprising said identifier of said network entity profile template, and generating a network entity profile for said network entity based on said at least one profile attribute.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
5GC 5G core network
FQDN fully-qualified host name
HTTP hypertext transfer protocol
IP internet protocol
JSON JavaScript object notation
NF network function
NRF network repository function
OAM operation, administration and maintenance
SCP service communication proxy
UDM unified data management

What is claimed is:

1. An apparatus of a network repository function entity, the apparatus comprising: at least one processor and at least one memory including computer program code, wherein the at least one memory and the computer program code are configured, with the at least one processor, to cause the apparatus to at least perform the following:
receive from a control entity, network entity profile template information, and
store said network entity profile template information, wherein
said network entity profile template information comprises a network entity profile template including an identifier of said network entity profile template and a profile content of said network entity profile template, said profile content including at least one profile attribute, and
receive, from a network entity, a network entity registration request comprising said identifier of said network entity profile template and a network entity specific attribute, and the apparatus further configured to:
generate a network entity profile for said network entity based on said at least one profile attribute in response to the network entity registration request to enable an efficient provision, storage and exchange of network function profile information by the at least one memory of the apparatus;
if said at least one profile attribute includes said network entity specific attribute, replace, in said network entity profile, a value of said network entity specific attribute included in said at least one profile attribute by a value of said network entity specific attribute included in said network entity registration request, and
if said at least one profile attribute does not include said network entity specific attribute, add, to said network entity profile, said network entity specific attribute included in said network entity registration request.

2. The apparatus according to claim 1, further configured to
receive, from said network entity, a network entity registration update including a network entity specific attribute, and
replace, in said network entity profile, if said at least one profile attribute includes said network entity specific attribute, a value of said network entity specific attribute included in said at least one profile attribute by a value of said network entity specific attribute included in said network entity registration update, and
add, to said network entity profile, if said at least one profile attribute does not include said network entity specific attribute, said network entity specific attribute included in said network entity registration update.

3. The apparatus according to claim 2, further configured to
transmit, towards said network entity, attributes error information indicating that said network entity specific attribute is not applicable with said network entity profile template, and
transmit, towards said network entity, network entity profile template identifier error information indicating that said identifier included in said network entity registration request is unknown.

4. The apparatus according to claim 1, further configured to:
   transmit towards said network entity, said network entity profile generated for said network entity.

5. The apparatus according to claim 1, further configured to
   receive from said network entity, an inquiry with respect to features supported by said network repository function entity, and
   transmit towards said network entity, information indicative of that network entity profile templates are supported by said network repository function entity.

6. An apparatus of a network entity, the apparatus comprising: at least one processor and at least one memory including computer program code, wherein the at least one memory and the computer program code are configured, with the at least one processor, to cause the apparatus to at least perform the following:
   transmit, towards a network repository function entity, a network entity registration request comprising an identifier of a network entity profile template and a network entity specific attribute;
   receive, from said network repository function entity, a network entity profile generated for said network entity and to receive error information indicating that said network entity specific attribute is not applicable with said network entity profile template; and
   receive, from a control entity, a network entity profile configuration,
   wherein said network entity profile configuration comprises said identifier of said network entity profile template and information on network entity specific changes to said network entity profile template, and
   said network entity specific attribute is based on said network entity specific changes to said network entity profile template.

7. The apparatus according to claim 6, further configured to
   receive, from said network repository function entity, network entity profile template identifier error information indicating that said identifier included in said network entity registration request is unknown.

8. The apparatus according to claim 6, further configured to
   transmit, towards said network repository function entity, an inquiry with respect to features supported by said network repository function entity, and
   receive, from said network repository function entity, information indicative of that network entity profile templates are supported by said network repository function entity.

9. The apparatus according to claim 6, wherein said network entity is a network function entity or a service communication proxy entity.

\* \* \* \* \*